United States Patent [19]
Tanaka et al.

[11] Patent Number: 5,463,443
[45] Date of Patent: Oct. 31, 1995

[54] CAMERA FOR PREVENTING CAMERA SHAKE

[75] Inventors: Etsuo Tanaka, Tokyo; Tadao Kai, Kawasaki; Hiroshi Okano, Tokyo; Akira Katayama, Koganei; Yoshio Imura, Kawasaki, all of Japan

[73] Assignee: Nikon Corporation, Tokyo, Japan

[21] Appl. No.: 321,466

[22] Filed: Oct. 11, 1994

Related U.S. Application Data

[63] Continuation of Ser. No. 24,760, Mar. 2, 1993, abandoned.

[30] Foreign Application Priority Data

| Mar. 6, 1992 | [JP] | Japan | 4-084434 |
| May 13, 1992 | [JP] | Japan | 4-146997 |
| Jul. 3, 1992 | [JP] | Japan | 4-200704 |

[51] Int. Cl.⁶ .............. G03B 5/00; G03B 17/20
[52] U.S. Cl. .............. 354/430; 354/472
[58] Field of Search ............. 354/430, 202, 354/70, 471, 474, 475, 472, 195.13, 289.1, 289.12, 410; 348/208; 359/554–559

[56] References Cited

U.S. PATENT DOCUMENTS

| 4,788,596 | 11/1988 | Kawakami et al. | 358/222 |
| 4,862,277 | 8/1989 | Iwaibana | 358/222 |
| 5,062,696 | 11/1991 | Oshima et al. | 359/554 |
| 5,130,729 | 7/1992 | Sato et al. | 354/202 |
| 5,198,856 | 3/1993 | Odaka et al. | 354/430 |
| 5,245,378 | 9/1993 | Washisu | 354/410 |

Primary Examiner—W. B. Perkey
Attorney, Agent, or Firm—Shapiro and Shapiro

[57] ABSTRACT

An anti-shake camera includes a camera shake correction lens for correcting image blurring caused by a camera shake, a camera shake correction lens position detection device for detecting the moving position of the camera shake correction lens, and an indication device for indicating a shaking direction of the camera so as to decrease the moving amount of the camera shake correction lens from a neutral position.

124 Claims, 17 Drawing Sheets

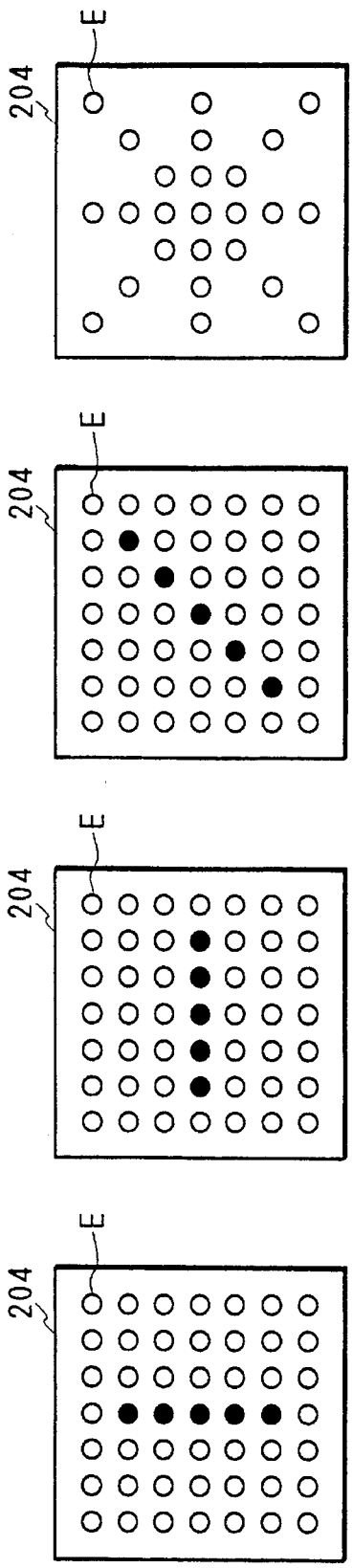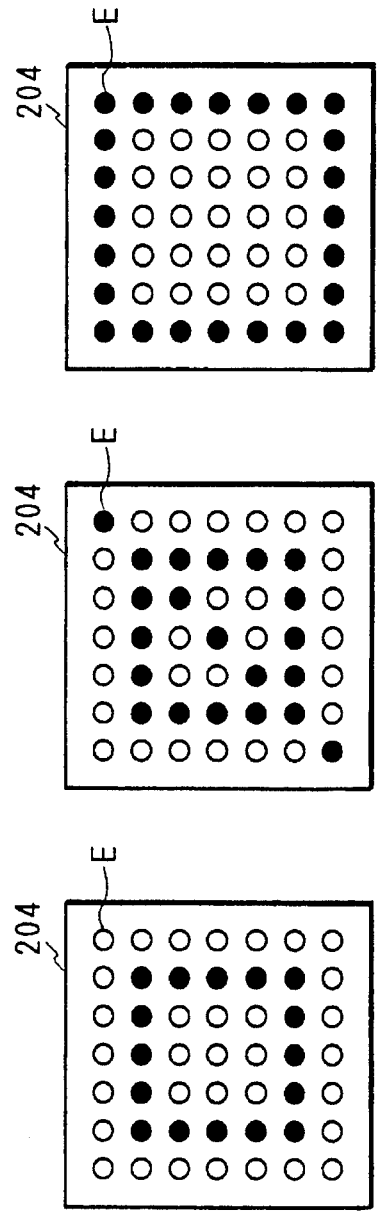

CAMERA FOR PREVENTING CAMERA SHAKE

This is a continuation of application Ser. No. 08/024,760 filed Mar. 2, 1993, now abandoned.

BACKGROUND OF THE INVENTION

1. Field of the Invention

The present invention relates to a camera for preventing camera shake.

2. Related Background Art

As prior art, for example, a technique for indicating a camera shake in the form of, e.g., a bar graph proportional to the shake amount together with a shake amount allowable range before a photographing operation, and a technique for indicating a degree of shake after a photographing operation are known (Japanese Laid-Open Patent Application No. 2-126251).

Also, for a case when the shake amount exceeds an allowable range, a technique for causing, e.g., the bar graph to flicker, or generating a tone to warn a camera shake state to a photographer, is known (Japanese Laid-Open Patent Application No. 2-126250).

Also known is an anti-shake camera, which comprises a shake sensor and a shake correction lens, and moves the shake correction lens along a plane perpendicular to the optical axis on the basis of the shake amount detected by a shake sensor so as to prevent a camera shake. The shake correction lens is restricted by a mechanical or electrical stopper means so as to be movable within a positional range in which optical image quality is not deteriorated or deteriorated only slightly, thereby determining a correction range.

However, in the above-mentioned prior art, only the magnitude of the shake amount is indicated before a photographing operation, and the moving direction of the center of shake is unknown. When the center of shake moves, the shake correction lens may reach the end of the correction range.

More specifically, when the center of shake is located at the end of the correction range upon releasing of a shutter, since the shake correction lens moved in the shake correction direction is stopped by the stopper, and a camera shake cannot be satisfactorily corrected, a photographed picture has a blurred image even if the magnitude of shake is detected before the photographing operation.

In general, in a hand-held photographing operation, especially when a lens having a large focal distance is used or when a low shutter speed is selected, a camera shake easily occurs, and image quality of a picture is deteriorated. In order to prevent this, a camera shake state is informed to a photographer, thereby preventing a blurred picture. As such an information means, an alarm tone may be generated, or a vertical or horizontal bar representing the shake amount may be indicated in a finder.

With the above-mentioned camera-shake alarm device, a camera shake state can be confirmed. However, how to suppress a camera shake is not easily understood. When the device generates an alarm tone, the alarm tone may undesirably be generated in a situation requiring quietness.

Furthermore, in conventional cameras, various alarm indications are made. As the most popular one of these alarm indications, a camera shake alarm indication of a camera is known. In the conventional camera shake alarm indication, a shutter speed indication is caused to flicker, or an alarm tone is generated. Furthermore, a pattern representing a camera shake is provided as liquid crystal indication segments, and is caused to flicker on a liquid crystal screen (LCD) arranged on the casing of the camera or in a finder (e.g., Japanese Patent Publication No. 62-37771).

A beginner cannot often recognize what an alarm means based on the above-mentioned flickering indication of a shutter speed or the tone. An alarm by means of flickering indication of the special pattern on the LCD cannot be identified if the pattern is complicated and small, although it allows easy recognition as compared to other alarm methods. Conversely, if the pattern is large, it undesirably decreases a space for other indications. These alarm indications can inform a camera shake state, but cannot inform a degree of camera shake to a photographer. In addition, the photographer can know a camera shake state, but cannot understand how to suppress the camera shake.

SUMMARY OF THE INVENTION

It is an object of the present invention to provide an anti-shake camera, which can reliably prevent a camera shake, in such a manner that a shake correction lens is not located at the end of a correction range upon releasing of a shutter.

It is another object of the present invention to provide a camera shake alarm device, which allows a photographer to easily understand the behavior of camera shake.

It is still another object of the present invention to provide a camera shake indication device for a camera, which does not require a new indication unit, and performs a camera shake indication in an indication form with which a photographer can easily recognize a degree of camera shake.

In order to achieve the above objects, an anti-shake camera according to a first aspect of the present invention comprises a camera shake correction lens, which is movable in a plane perpendicular to an optical axis, camera shake correction lens position detection means for detecting an amount of eccentricity of the camera shake correction lens from the optical axis, and indication means for indicating a camera shaking direction for making the amount of eccentricity zero.

Also, according to a second aspect of the present invention, an anti-shake camera comprises a camera shake correction lens, which is movable in a plane perpendicular to an optical axis, operation range limiting means for limiting an operation range of the camera shake correction lens, camera shake correction lens position detection means for detecting an amount of eccentricity of the camera shake correction lens from the optical axis, and indication means which, when the camera shake correction lens approaches the operation range limiting means, indicates a camera shaking direction for making the amount of eccentricity of the camera shake correction lens zero in a larger scale than that in a case wherein the camera shake correction lens is far from the operation range limiting means.

In these cases, the camera shake correction lens position detection means comprises neutral position detection means for detecting a neutral position of the camera shake correction lens, and movement detection means for detecting a moving amount and a moving direction of the camera shake correction lens.

According to another aspect of the invention, an anti-shake camera comprises a camera shake correction lens, which is movable in a plane perpendicular to an optical axis, operation range limiting means for limiting an operation range of the camera shake correction lens, and setting position moving means which, when the camera shake correction lens contacts the operation range limiting means, moves the camera shake correction lens to a setting position in the operation range.

According to the present invention, a camera shake prevention operation is started in a photographing standby state before a shutter button is released (e.g., in a state wherein a half-stroke switch is turned on upon depression of the shutter button to the half-stroke position). More specifically, the camera shake correction lens moves to correct the camera shake, and its center is located at an eccentric position from the center of the optical axis. When the camera shake correction lens is located at the center of its movable stroke, since the lens has the maximum correction range in the up-and-down and right-and-left directions, the camera shake can be satisfactorily corrected.

The indication means of the present invention indicates a camera moving direction for making the amount of eccentricity of the camera shake correction lens zero, and maximizing the camera shake correction stroke. As an indication method, the moving direction may be indicated in the form of, e.g., a bar graph on the peripheral portion of a screen in a finder.

When the amount of eccentricity of the camera shake correction lens is increased, and the lens approaches the operation range limiting means (stopper), a long, large arrow, for example, is indicated to inform a photographer that the camera shake correction lens is near the operation range limiting means. More specifically, this indication urges the photographer to largely shake a camera in the direction of the large arrow indicated by the indication means, so that the amount of eccentricity of the camera shake correction lens becomes zero.

When the photographer changes the direction of the camera according to the indication by the indication means, the camera shake correction lens is always located near the center of its movable stroke, and the amount of eccentricity is almost zero. Thus, the shake correction range can be maximized, and a possibility that the correction lens contacts the operation range limiting means to disable shake correction is lowered.

When the camera shake correction lens contacts the operation range limiting means, the setting position moving means moves the camera shake correction lens to a setting position in the operation range, e.g., to a neutral position. Thus, the correction lens can be returned to a position near the center of the movable stroke, and having an amount of eccentricity of zero.

A camera shake alarm device according to another aspect of the present invention comprises shake detection means for detecting a camera shake, and camera shake indication means for indicating the camera shake as a line segment on the basis of an output from the detection means, so that the shake amount is represented by the length of the line segment, and the shake direction is represented by an indication angle of the line segment.

According to the present invention, a camera shake is indicated as a line segment, so that the amount and direction of the camera shake can be informed to a photographer. Thus, the photographer can more easily understand the behavior of the camera shake.

Furthermore, a camera shake indication device for a camera according to still another aspect of the present invention comprises shake detection means for detecting a camera shake amount on the basis of an output from a shake sensor, information signal generation means for generating a signal of a photographing information value of the camera, indication means having scale marks representing the photographing information value, scale marks representing the shake amount, and a level indication element consisting of a plurality of segments, and indication control means for selecting one of the shake amount signal and the photographing information value signal, and generating an indication signal, wherein one of the photographing information value and the shake amount is indicated using the scale marks corresponding to the selected signal and the level indication element.

In this case, the indication control means selects the shake amount signal in response to a half-stroke state of a release button, and generates the indication signal.

Furthermore, in this case, the indication means indicates the shake amount, so that the indication level changes according to the magnitude of the shake amount to be indicated.

Also, a camera shake indication device for a camera according to still another aspect of the present invention comprises shake detection means for detecting a camera shake amount on the basis of an output from a shake sensor, indication means for indicating a photographing information value of the camera, and conversion means for converting the shake amount into a corresponding information value as the corresponding photographing information value, so that a photographing result has a predetermined shake amount, and for causing the indication means to indicate the corresponding information value.

In this case, the indication means simultaneously indicates the corresponding photographing information value, and the currently set photographing information value.

Also, in this case, the photographing information value is a photographing shutter time.

Furthermore, in this case, the indication means starts indication of the shake amount in response to a half-stroke state of a release button.

Moreover, in this case, the indication means indicates the shake amount, so that the indication level changes according to the magnitude of the shake amount to be indicated.

In an arrangement according to the present invention, indication of the camera shake amount is performed by interrupting indication of the photographing information value on the indication means for a predetermined period of time in a half-stroke state of a release button, and using the indication means whose indication of the photographing information value is interrupted. The photographing information value whose indication is to be interrupted includes a shutter time, a focal distance, an exposure level, and the like.

The indication means for indicating the photographing information value, e.g., a shutter time, comprises shutter scale marks, an indication element consisting of a plurality of segments arranged in correspondence with the shutter scale marks, and shake scale marks. When the indication means indicates a shutter time, the shutter scale marks and the segments of the indication element corresponding to the set shutter time are turned on; when the indication means indicates a shake amount, the shake amount is level-indicated in an analog manner using the shake scale marks to have the segment at one end of the indication element as a start point. When the shake amount exceeds the shake scale mark, it represents a large shake amount.

As another indication means, indication means which comprises an indication element consisting of at least two arrays of segments, and simultaneously indicates a photographing information value and a shake amount, may also be used. When this indication means indicates a photographing information value alone, all the arrays of segments are used; when it simultaneously indicates a photographing information value and a shake amount, the photographing information value is indicated using a predetermined array of segments, and the shake amount is level-indicated in an analog manner using the other array of segments. In particular, when the photographing information value is a shutter time, since the shutter time and a camera shake have a close relationship therebetween, the relationship between the selected shutter time and a corresponding shake amount can be readily indicated.

BRIEF DESCRIPTION OF THE DRAWINGS

FIGS. 14A to 14D are views showing embodiments of a shake indication according to the present invention;

FIGS. 15A to 15C are views showing embodiments of a shake critical value indication according to the present invention;

DESCRIPTION OF THE PREFERRED EMBODIMENTS

The preferred embodiments of the present invention will be described hereinafter with reference to the accompanying drawings.

Figure 1:
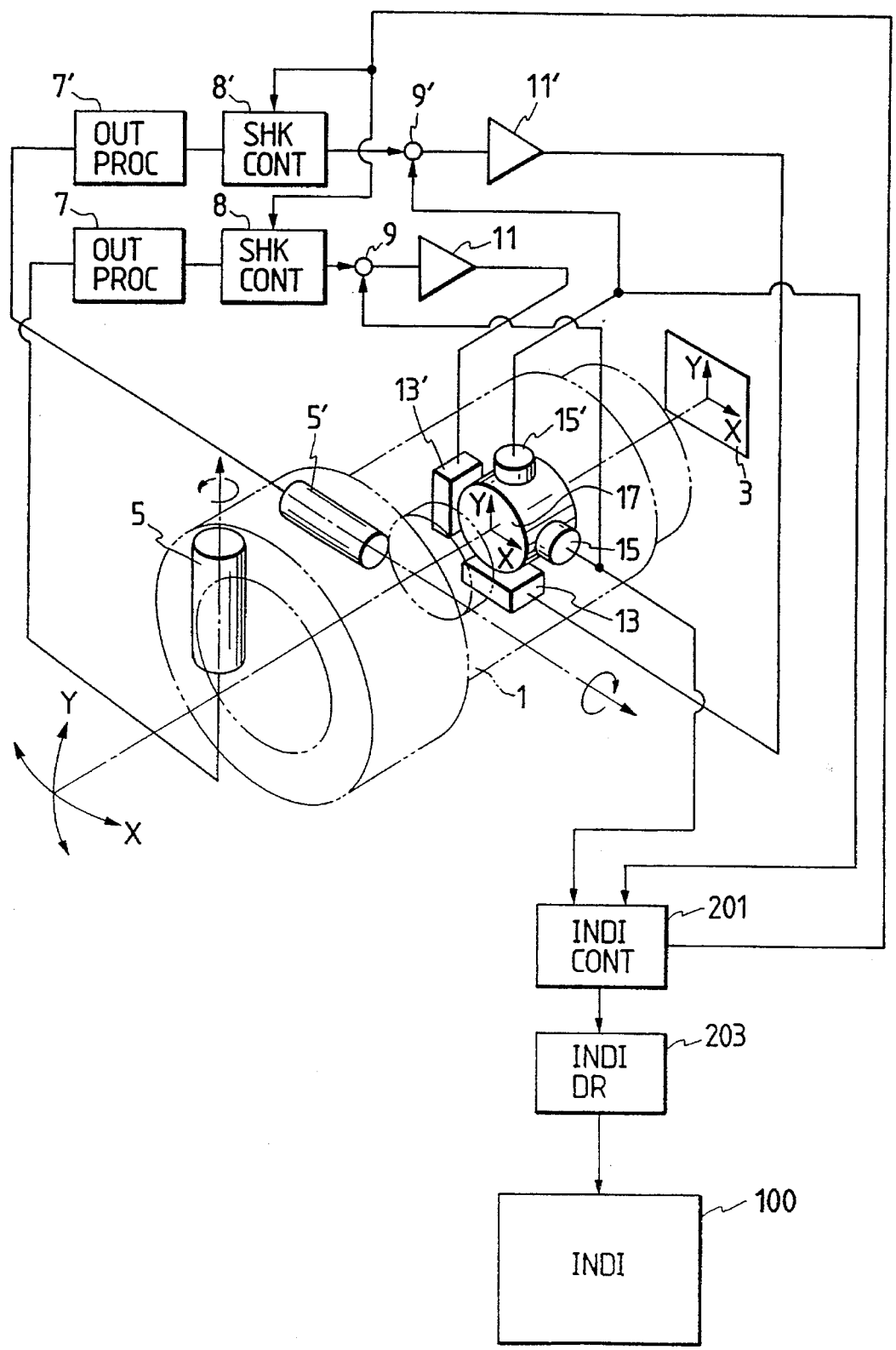
FIG. 1 is a schematic view showing an embodiment of an anti-shake camera according to the present invention.

FIG. 1 is a schematic view showing an embodiment of an anti-shake camera according to the present invention.

(Optical System and Control Unit)

The camera shown in FIG. 1 includes a lens barrel 1, a screen 3, and angular velocity sensors 5 and 5'.

The angular velocity sensor 5 is a sensor for detecting an angular velocity about an axis parallel to the Y-axis, and detects a camera shake in the X-direction of the screen.

The angular velocity sensor 5' is a sensor for detecting an angular velocity about an axis parallel to the X-axis, and detects a camera shake in the Y-direction of the screen.

Note that the arrangements for camera shakes in the X- and Y-directions are the same, and only a camera shake in the X-direction of the screen will be explained below unless otherwise necessary. In the following description, a dash is added to reference numerals of components associated with a camera shake in the Y-direction, and no dash is added to those associated with a camera shake in the X-direction.

A detection signal from the angular velocity sensor 5 is supplied to a shake control circuit 8 via an output processing circuit 7. The shake control circuit 8 is a circuit for calculating the moving amount, in the X-direction, of a camera shake correction lens 17 on the basis of a signal processed by the output processing circuit 7 so as to correct a camera shake, and outputting a shake correction signal.

The output from the shake control circuit 8 is supplied to a driving amplifier 11 via a feedback node 9. The driving amplifier 11 is an amplifier for amplifying the shake correction signal from the shake control circuit 8, and generating a motor driving signal.

A camera shake correction lens driving portion is a portion for driving the camera shake correction lens 17, and comprises, e.g., a motor 13, a feed screw 13c, and the like, as will be described later.

A camera shake correction lens position detection means 15 detects whether or not the amount of eccentricity of the camera shake correction lens 17 is zero, and comprises a brush 15*f*, and a photointerrupter (15*g*, 15*f*) for counting the amount of eccentricity from the brush, as will be described later.

An indication control means (CPU) 201 calculates a direction in which the camera is to be shaken, so that the camera shake correction lens 17 is moved to the center of the optical axis. The output from the means 201 is supplied to an indication portion (indication means) 100 arranged on the peripheral portion of a finder screen 35 through an indication driver 203.

The indication portion 100 indicates indication patterns 101, 101', 103, 103', 105, 105', 107, and the like shown in FIGS. 6, 7, 8, and 9, as will be described later.

Figure 2:
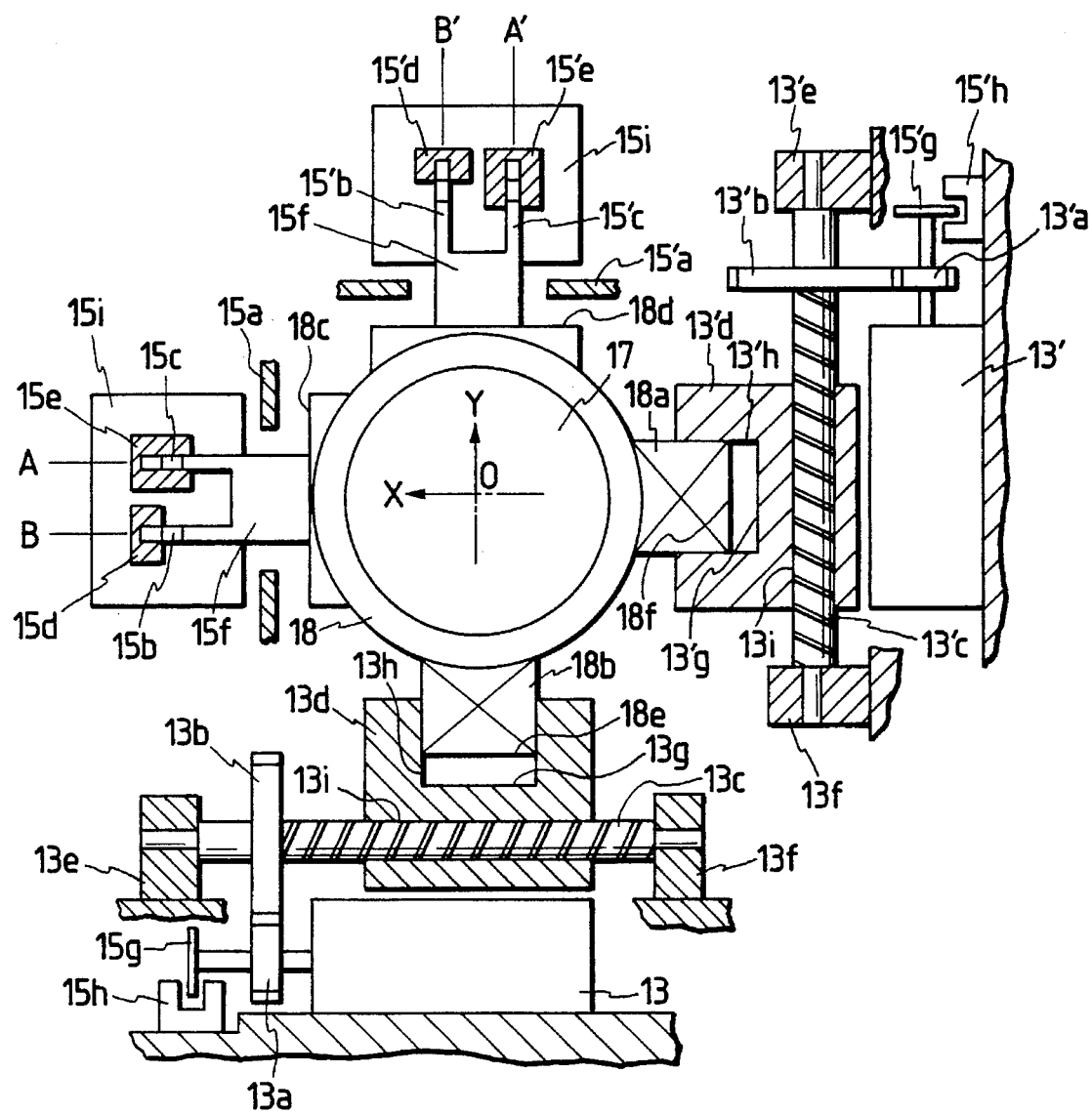
FIG. 2 is a view showing the details of a camera shake correction lens portion of the anti-shake camera of the embodiment shown in FIG. 1.

FIG. 2 shows the camera shake correction lens driving portion of the anti-shake camera according to the present invention when viewed from the screen side. Note that FIG. 2 illustrates a case wherein the camera shake correction lens 17 is located at a neutral position. In this case, since a Y-direction driving portion is associated with correction in the X-direction, some explanations will also be given about the Y-direction driving portion.

(Camera Shake Correction Lens)

The camera shake correction lens 17 is a lens, which is moved in a plane perpendicular to the optical axis so as to correct a camera shake. The camera shake correction lens 17 is fixed to and supported by a camera shake correction lens frame 18. In the following description, the camera shake correction lens includes the camera shake correction lens frame 18.

The camera shake correction lens frame 18 is formed with projections 18*a* and 18*b* each having a rectangular section at the right and lower sides in FIG. 2, and flat end faces 18*f* and 18*e* are formed on the distal ends of the projections 18*a* and 18*b*. Also, reference surfaces 18*c* and 18*d* for detecting the position of the camera shake correction lens 17 are formed at the left and upper sides in FIG. 2 of the frame 18. The reference surfaces 18*c* and 18*d* have flat end faces.

(Camera Shake Correction Lens Driving Portion)

The motors 13 and 13' are motors for driving the camera shake correction lens 17, and pinion gears 13*a* and 13'*a* are fixed to their motor shafts. The pinion gears 13*a* and 13'*a* are respectively meshed with gears 13*b* and 13'*b* fixed to the male screws 13*c* and 13'*c*.

A feed member 13*d* is a member for moving the camera shake correction lens 17, and has a female screw 13*i*, which threadably receives the male screw 13*c*. The feed member 13*d* can be moved in the right-and-left direction in FIG. 2 upon rotation of the male screw 13*c*.

A rectangular hole 13*h* is formed on the upper portion of the feed member 13*d*, and receives the projection 18*b* having a rectangular section. The projection 18*b* is slidable in the up-and-down direction of FIG. 2 with respect to the feed member 13*d*. The rectangular hole 13*h* has a flat bottom portion serving as a stopper 13*g*.

Bearings 13*e* and 13*f* respectively receive loads in the radial and thrust directions of the male screw 13*c*. In this case, the backlash of the male screw 13*c* is removed by, e.g., a washer (not shown) since the screw 13*c* must not suffer from a backlash in the thrust direction.

A feed member 13'*d* is a member for moving the camera shake correction lens 17, and has a female screw 13'*i* for threadably receiving the male screw 13'*c*. The feed member 13'*d* can be moved in the up-and-down direction in FIG. 2 upon rotation of the male screw 13'*c*.

A rectangular hole 13'*h* is formed on the left portion of the feed member 13'*d*, and receives the projection 18*a* having a rectangular section. The projection 18*a* is slidable in the right-and-left direction of FIG. 2 with respect to the feed member 13'*d*. The rectangular hole 13'*h* has a flat bottom portion serving as a stopper 13'*g*.

Bearings 13'*e* and 13'*f* respectively receive loads in the radial and thrust directions of the male screw 13'*c*. In this case, the backlash of the male screw 13'*c* is removed by, e.g., a washer (not shown) since the screw 13'*c* must not suffer from a backlash in the thrust direction.

With the above-mentioned arrangement, the male screws 13*c* and 13'*c* are rotated upon rotation of the motors 13 and 13', and the camera shake correction lens 17 can be moved to a desired position within an operation limiting range on the X-Y plane.

The fitting states between the projection 18*b* and the rectangular hole 13*h* and between the projection 18*a* and the rectangular hole 13'*h* are realized by means of rectangular holes and rectangular sections, but may be realized by means of pins and round holes.

(Stopper)

Stoppers for limiting operations in the four directions around the camera shake correction lens 17 will be described below.

A stopper 15*a* is used for limiting a leftward operation of the camera shake correction lens 17, and serves as a leftward operation limit, in the X-direction in FIG. 2, of the camera shake correction lens 17 when it contacts the reference surface 18*c* for detecting the position of the camera shake correction lens 17.

The stopper 13'*g* is the bottom surface of the rectangular hole 13'*h*, and serves as a rightward operation limit, in the X-direction in FIG. 2, of the camera shake correction lens 17 when it contacts the end face 18*f* of the projection 18*a* having a rectangular section.

A stopper 15'*a* limits an upward operation of the camera shake correction lens 17, and serves as an upward operation limit, in the Y-direction in FIG. 2, of the camera shake correction lens 17 when it contacts the reference surface 18*d* for detecting the position of the camera shake correction lens 17.

The stopper 13*g* is the bottom surface of the rectangular hole 13*h*, and serves as a downward operation limit, in the Y-direction in FIG. 2, of the camera shake correction lens 17 when it contacts the end face 18*e* of the projection 18*b* having a rectangular section.

The stoppers 15*a* and 15'*a* have central holes for receiving brushes 15*f* and 15'*f*.

(Camera Shake Correction Lens Position Detection Means)

The brush 15*f* is used for detecting if the amount of eccentricity, in the X-direction, of the camera shake correction lens 17 is zero. The base portion side of the brush 15*f* is fixed to a portion (reference surface 18*c* side) of the lens frame 18, and the distal end side thereof is divided into contact portions 15*b* and 15*c*.

An insulating substrate 15*i* has conductor portions 15*d* and 15*e* on its surface. A lead wire A is connected to the conductor portion 15*e*, and a lead wire B is connected to the conductor portion 15*e*.

In FIG. 2, when the camera shake correction lens 17 is eccentrically located at the left-hand side of the optical axis, the contact portion 15b contacts the conductor portion 15d, and the lead wires A and B are electrically connected to each other. Conversely, when the camera shake correction lens 17 is eccentrically located at the right-hand side of the optical axis, the contact portion 15b contacts the surface of the insulating surface 15i, and the electrical connection between the lead wires A and B is disconnected.

When the contact portion 15b is switched from the electrical connection state between the lead wires A and B to the disconnection state therebetween, or vice versa, it can be detected that the amount of eccentricity, in the X-direction, of the camera shake correction lens 17 is zero. In FIG. 2, the position where the contact portion 15b contacts the right end of the conductor portion 15d corresponds to a case wherein the amount of eccentricity, in the X-direction, of the camera shake correction lens 17 is zero.

With the above-mentioned arrangement, whether or not the amount of eccentricity, in the X-direction, of the camera shake correction lens 17 is zero can be detected (neutral position detection means).

An encoder plate 15g is fixed to a shaft coaxially attached to the output shaft of the motor 13. Two photocouplers 15h are arranged around the encoder plate 15g. The encoder plate 15g and the photocouplers 15h constitute the photointerrupter (15g, 15h).

Upon rotation of the motor 13, pulses are generated from the photointerrupter (15g, 15h). Since the two photocouplers 15h are arranged around the encoder plate 15g, a forward/reverse rotation of the motor 13 can be detected based on the outputs from the two photocouplers 15h. Therefore, when the pulses are counted, the moving amount and the moving direction of the camera shake correction lens 17 can be detected (movement detection means).

Since the contact portion 15b of the brush 15f can detect a timing at which the amount of eccentricity, in the X-direction, of the camera shake correction lens 17 is zero, and the displacement amount therefrom can be detected based on the pulses from the photointerrupter (15g, 15h), a position calculation circuit 15j (not shown) can calculate the position of the camera shake correction lens 17 on the basis of the electrical connection state between the lead wires A and B, and the number of pulses output from the photointerrupter (15g, 15h) (camera shake correction lens position detection means).

As described above, the lead wires A and B, and the members 15b, 15c, 15d, 15e, 15f, 15g, and 15h constitute the X-direction camera shake correction lens position detection means 15, and the like shown in FIG. 1. Also, a Y-direction camera shake correction lens position detection means 15' is constituted by lead wires A' and B', members 15'b, 15'c, 15'd, 15'e, 15'f, 15'g, and 15'h, and the like, as in the X-direction.

In this embodiment, the camera shake correction lens 17 can be eccentrically moved from the neutral position leftward by 1.5 mm; rightward by 1.5 mm; upward by 1.5 mm; and downward by 1.5 mm.

Therefore, when the camera shake correction lens 17 is located at the neutral position, the intervals between the stopper 15a and the reference surface 18c, between the stopper 13'g and the end face 18f, between the stopper 15'a and the reference surface 18d, and between the stopper 13g and the end face 18e are respectively 1.5 mm. When the lens 17 is eccentrically moved by this amount, it contacts the stopper 15a or 15'a, or the stopper 13g or 13'g.

In this manner, when the camera shake correction lens frame 18 contacts the stopper 15a or 15'a, or the stopper 13g or 13'g during exposure, the camera shake correction lens 17 cannot be moved any more, and can no longer provide an anti-shake function. As a result, a photographed picture becomes a blurred one. The present invention has been achieved to decrease a possibility of such a failure as much as possible.

(Main Flow)

Figure 3:
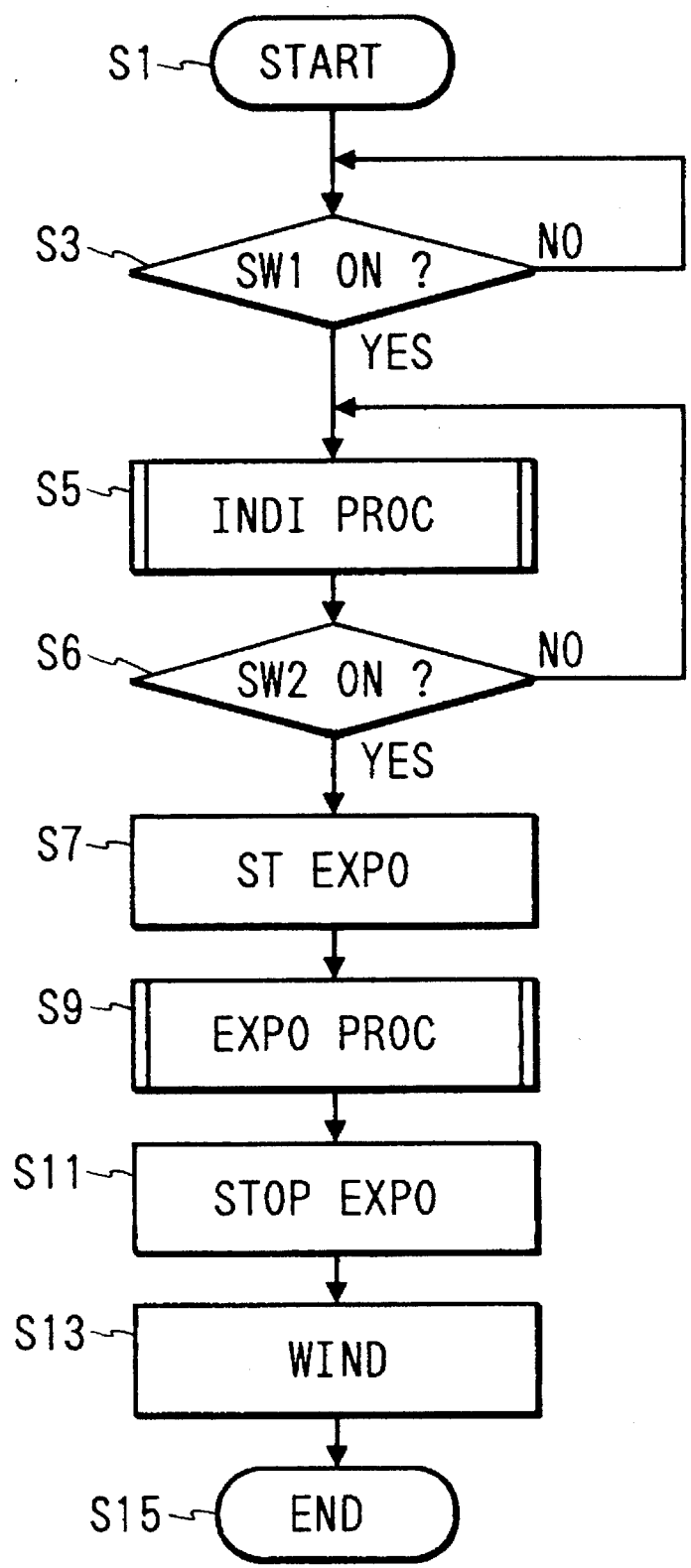
FIG. 3 is a flow chart showing an operation of the anti-shake camera according to the embodiment of the present invention.
Figure 4:
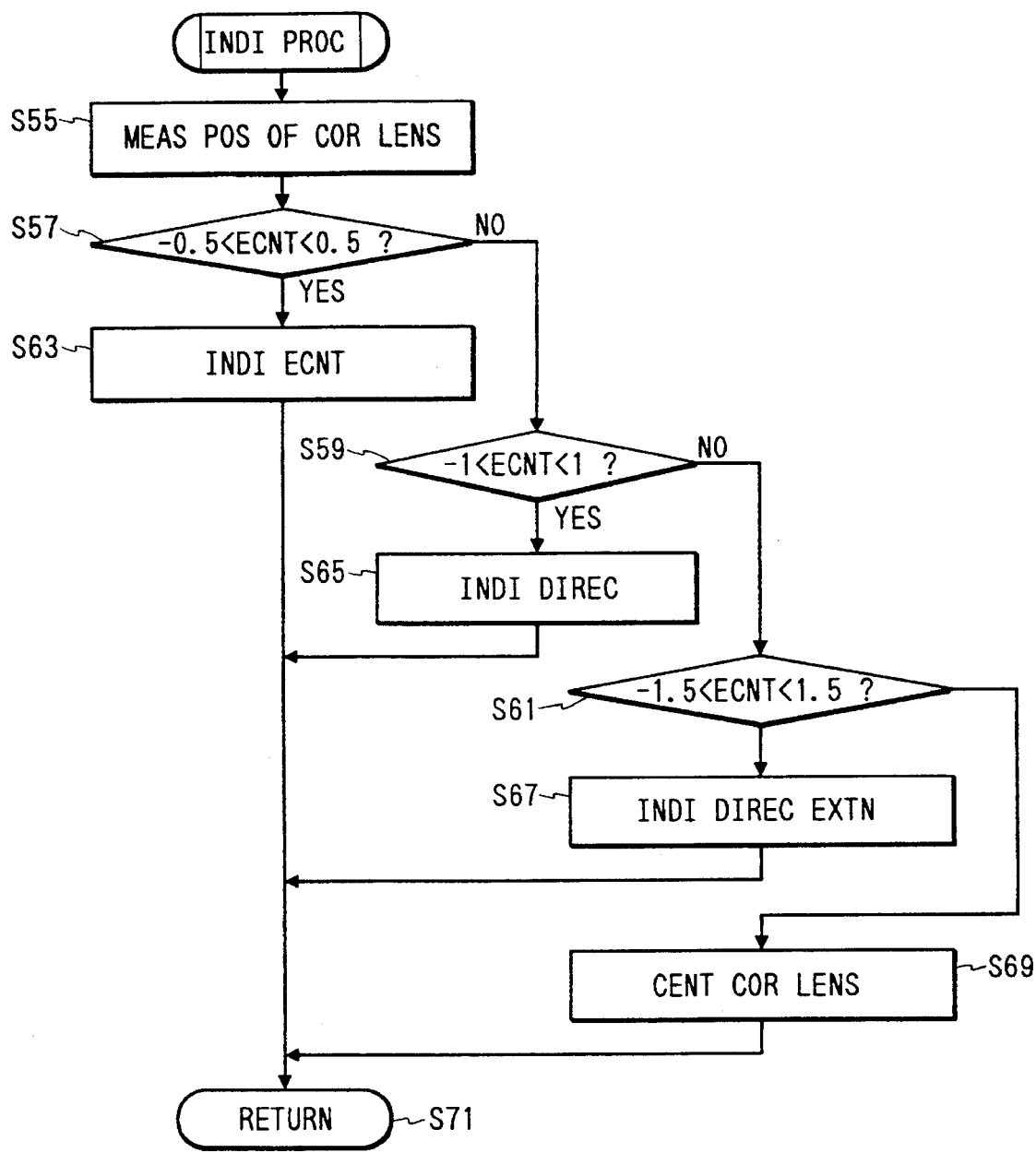
FIG. 4 is a flow chart showing the details of indication processing (S5) in FIG. 3.
Figure 5:
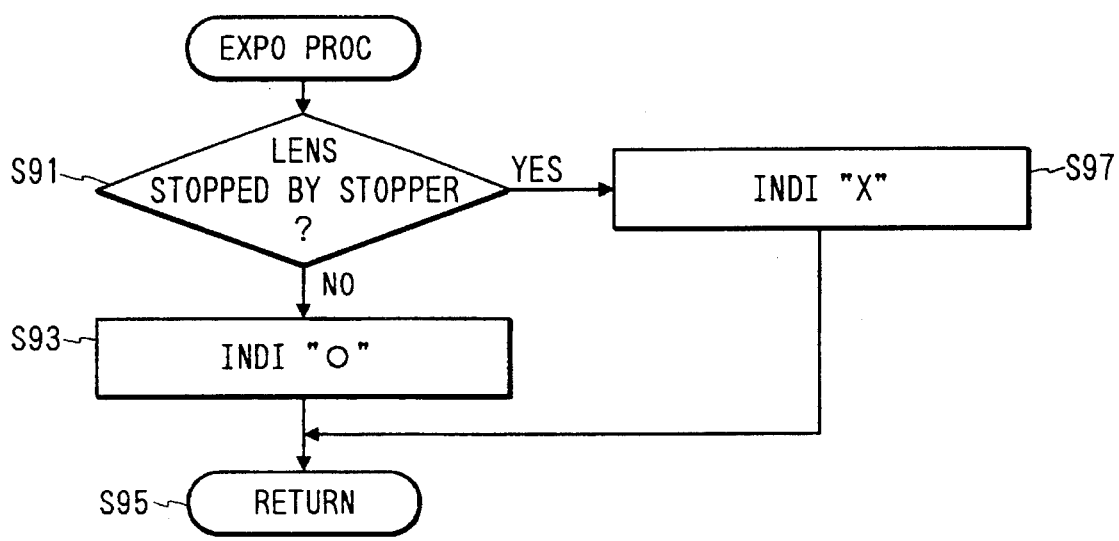
FIG. 5 is a flow chart showing the details of exposure processing (S9) in FIG. 3.

FIG. 3 is a flow chart showing the main routine of the anti-shake camera according to this embodiment, FIG. 4 is a flow chart showing an indication processing subroutine, and FIG. 5 is a flow chart showing an exposure processing subroutine.

The flow shown in FIG. 3 is controlled by the CPU 201 or the shake control circuits 8 and 8' shown in FIG. 1. In this case, only an operation in the X-direction will be described below.

When a main switch (not shown) is turned on, the camera is powered, and the flow starts (S1). When a photographer determines a composition via the finder, and depresses a shutter button to a half-stroke position to turn on a half-stroke switch SW1 (S3), an AF device, an anti-shake device, an indication device, and the like start their operations to prepare for a photographing operation.

In step S5, indication processing for indicating a direction in which the camera is to be shaken, so that the camera shake correction lens is moved to the neutral position of the optical axis, is executed. Step S5 will be described in detail later with reference to FIG. 4.

When a full-stroke switch SW2 is turned on (S6), a shutter is opened to start exposure (S7).

In step S9, whether or not the camera shake correction lens 17 contacts a stopper is detected by the camera shake correction lens detection means 15, and the detection result is indicated for several seconds on the indication portion 100 around the finder screen 35. The exposure processing (S9) will be described in detail later with reference to FIG. 5.

When the shutter is closed to end exposure (S11), a film is wound, and a mechanism portion is charged (S13), thus completing a single photographing operation (S15).

(Indication Processing Subroutine)

The indication processing subroutine (step S5 in FIG. 3) will be described below with reference to FIG. 4. This flow is executed by the CPU 201 or the shake control circuits 8 and 8'.

In step S55, the position of the camera shake correction lens 17 is measured by the camera shake correction lens position detection means 15 so as to achieve the indication processing.

In the following description, an eccentricity on the left-hand side, along the X-axis, of a center 0 of the optical axis in FIG. 2 will be referred to as a positive eccentricity, and an eccentricity on the right-hand side of the center 0 will be referred to as a negative eccentricity. Also, an eccentricity above the Y-axis will be referred to as a positive eccentricity, and an eccentricity below the Y-axis will be referred to as a negative eccentricity. The corresponding amount of eccentricity will be expressed with a sign "+" or "−".

In this embodiment, a state wherein the camera shake correction lens 17 approaches the stopper 15a or 15'a, or the stopper 13g or 13'g means a state wherein the interval between the camera shake correction lens 17 and the stopper 15a or 15'a, or the stopper 13g or 13'g becomes equal to or smaller than ⅓ the interval obtained when the amount of eccentricity of the lens 17 is zero. Also, a state wherein the lens 17 is far from the stopper means a state wherein the interval becomes larger than ⅓ the interval obtained when the amount of eccentricity of the lens 17 is zero. In the latter case, ⅓ is excluded.

If it is determined in step S57 that the measured amount of eccentricity of the camera shake correction lens 17 falls within a range between −0.5 mm and +0.5 mm, the flow advances to step S63; otherwise, the flow advances to step S59.

Figure 6:
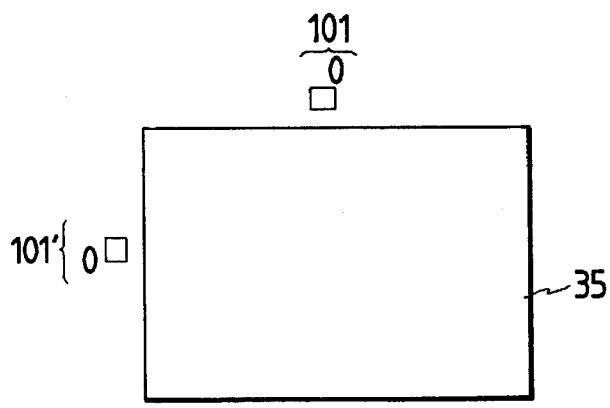
FIG. 6 is a view showing an indication of the anti-shake camera of the embodiment shown in FIG. 1.

In step S63, the indication patterns 101 and 101' are indicated on the indication portion 100 around the finder, screen 35 as shown in FIG. 6, and thereafter, the flow advances to step S71.

The indication patterns 101 and 101' shown in FIG. 6 represent that a correction optical system (camera shake correction lens 17) is moved to the center of the optical axis when the camera is slightly shaken leftward and is slightly shaken upward. The indication patterns 101 and 101' include short bar graphs since the amount of eccentricity is small.

Note that the shaking direction of the camera is determined by the CPU 201 in FIG. 1, and a signal is supplied to the indication driver 203, thereby turning on the indication patterns 101 and 101' of the bar graphs around the screen.

In step S59, it is checked if the amount of eccentricity of the camera shake correction lens 17 falls within a range between −1 mm and +1 mm. In practice, since it has already been checked in step S57 if the amount of eccentricity falls within the range between −0.5 mm and +0.5 mm, it is checked in step S59 if the amount of eccentricity of the camera shake correction lens 17 falls within a range between −1 mm and −0.5 mm (inclusive) or between +0.5 mm (inclusive) and +1 mm.

If YES in step S59, the flow advances to step S65; otherwise, the flow advances to step S61.

Figure 7:
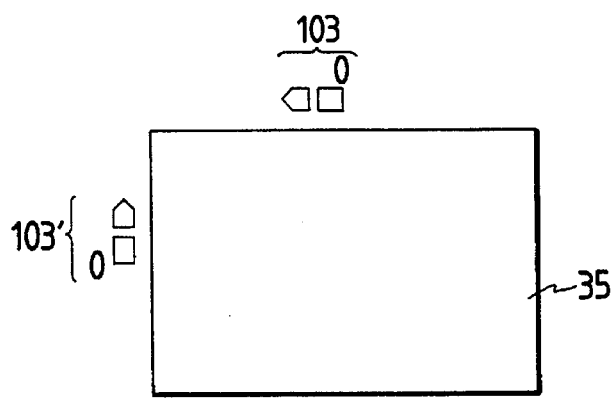
FIG. 7 is a view showing another indication of the anti-shake camera of the embodiment shown in FIG. 1.

In step S65, the indication patterns 103 and 103' are indicated on the indication portion around the finder, screen 35 as shown in FIG. 7, and thereafter, the flow advances to step S69.

The indication patterns 103 and 103' shown in FIG. 7 represent by means of the distal end shapes of bar graphs that the center of the camera shake correction lens 17 is moved to the center of the optical axis when the camera is relatively largely shaken leftward, and is relatively largely shaken upward.

In step S61, it is checked if the amount of eccentricity of the camera shake correction lens 17 falls within a range between −1.5 mm and +1.5 mm. In this case, the amount of eccentricity of −1.5 mm or +1.5 mm is excluded.

Since it has already been checked in step S59 if the amount of eccentricity falls within the range between −1 mm and +1 mm, it is checked in step S61 in practice if the amount of eccentricity falls within a range between −1.5 mm and −1 mm (inclusive) or between +1 mm (inclusive) and +1.5 mm. If YES in step S61, the flow advances to step S67; otherwise, the flow advances to step S69.

If the amount of eccentricity falls within the range in step S59, the interval between the stopper and the correction lens is equal to or smaller than ⅓ the interval obtained when the amount of eccentricity is zero.

Figure 8:
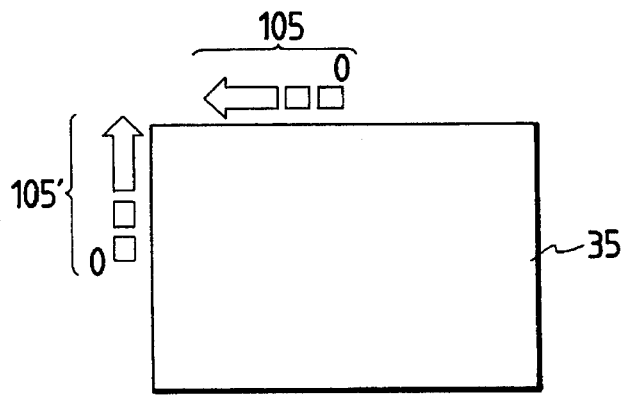
FIG. 8 is a view showing still another indication of the anti-shake camera of the embodiment shown in FIG. 1.

In step S67, the indication patterns 105 and 105' are indicated on the indication portion 35 around the finder, as shown in FIG. 8, and thereafter, the flow advances to step S71.

The indication patterns 105 and 105' shown in FIG. 8 represent that the center of the camera shake correction lens 17 returns to the center of the optical axis when the camera is largely shaken leftward, and is largely shaken upward.

When the camera is neither largely shaken leftward nor is largely shaken upward, the frame 18 of the camera shake correction lens 17 contacts the stopper 15a or 15'a, and camera shake correction by moving the camera shake correction lens 17 in a direction to approach the stopper 15a or 15'a is disabled.

In this case, the indication patterns 105 and 105' shown in FIG. 8 longer than the bar graphs shown in FIGS. 6 and 7 are indicated. The indication patterns 105 and 105' represent the shaking directions of the camera by means of the bar graphs and arrows so as to strongly appeal to the visual sense of the photographer.

A characteristic feature of this embodiment is that when the frame 18 of the camera shake correction lens 17 approaches a stopper, the size of the indication patterns is non-linearly increased to strongly appeal to the visual sense of the photographer, as described above. In addition to an appeal to the visual sense of the photographer, a method of generating an alarm tone to appeal to the aural sense of the photographer may be adopted, or both the methods may be adopted.

If it is determined in step S61 that the amount of eccentricity is −1.5 mm or +1.5 mm, since the frame 18 of the camera shake correction lens 17 contacts a stopper, and camera shake correction in the contact direction is disabled, the flow advances to step S69.

In step S69, one or both of the motors 13 and 13' are driven to return the camera shake correction lens 17 to its neutral position. The operation in step S69 aims at informing the photographer that the frame 18 of the camera shake correction lens 17 contacts a stopper, and also aims at maximizing the movable range of the camera shake correction lens 17 for a future camera shake.

After the indication in step S63, S65, or S67 is performed, the flow advances to step S71, and returns to step S7 in FIG. 3.

Figure 10:
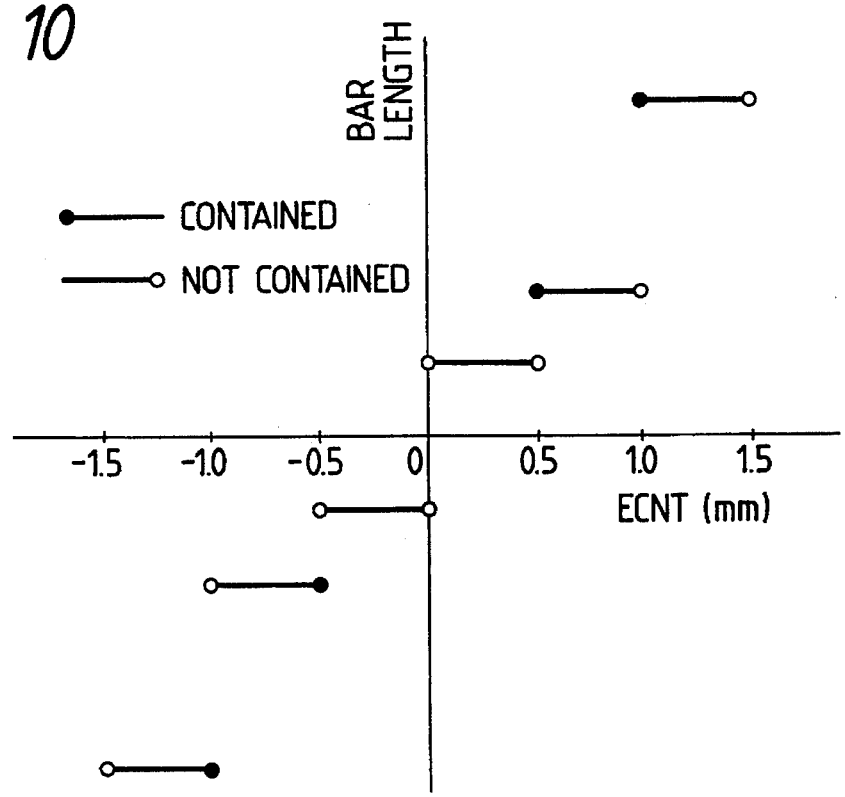
FIG. 10 is a graph showing the relationship between the amount of eccentricity of a camera shake correction lens and the bar length of a bar graph of the embodiment shown in FIG. 1.

In this embodiment, the amount of eccentricity of the camera shake correction lens 17 and the bar length of the bar graph representing the shaking amount of the camera so as to return the camera shake correction lens 17 to the center of the optical axis are changed stepwise, as shown in FIG. 10.

In FIG. 10, the bar length of the bar graph is immediately increased at a transition position of the amount of eccentricity from −1.0 mm to −1.5 mm and at a transition position from 1.0 mm to 1.5 mm, thereby informing the photographer that the camera shake correction lens 17 is close to a stopper.

Figure 11:
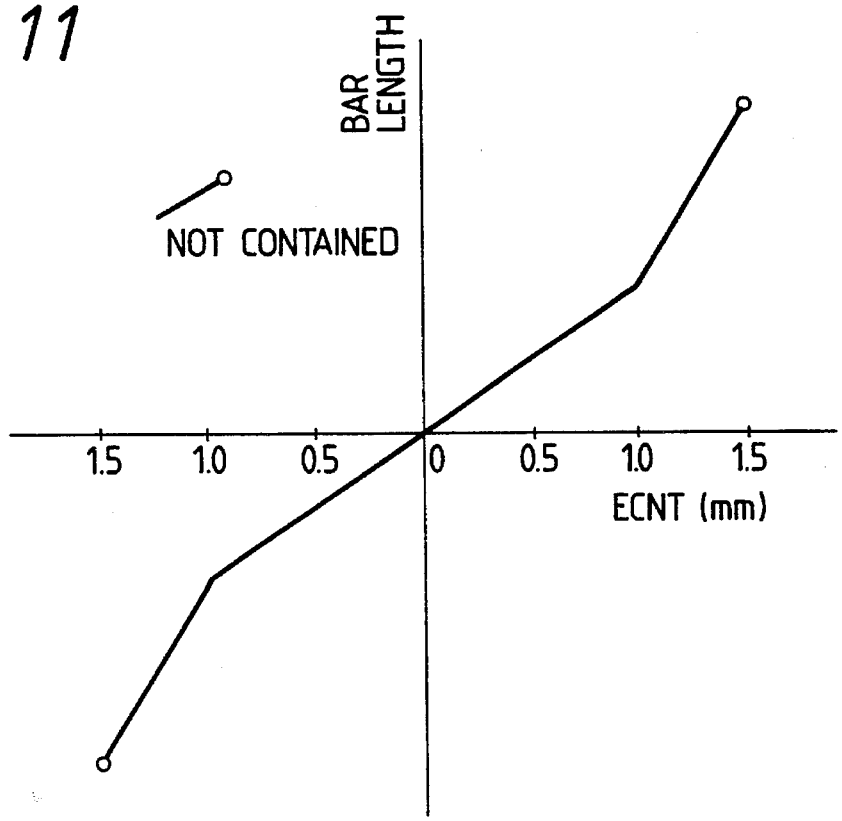
FIG. 11 is a graph showing another relationship between the amount of eccentricity of the camera shake correction lens and the bar length of the bar graph of the embodiment shown in FIG. 1.

The amount of eccentricity of the camera shake correction lens 17 and the bar length of the bar graph need not be changed stepwise, as shown in FIG. 10. Alternatively, they may be changed linearly, as shown in FIG. 11.

Even when the amount of eccentricity and the bar length are changed linearly, a straight line is bent at a position where the amount of eccentricity becomes smaller than −1.0 mm and at a position where the amount of eccentricity becomes larger than 1.0 mm, and the inclination of the straight line is immediately increased when the amount of eccentricity exceeds these points, so that the length of the bar graph is immediately increased with respect to the same change amount of eccentricity, thereby informing the photographer that the camera shake correction lens 17 is close to a stopper.

(Exposure Processing Subroutine)

The exposure processing subroutine in step S9 in FIG. 3 will be described in detail below with reference to FIG. 5.

Even if the camera shake correction lens 17 does not contact a stopper before exposure, if the lens 17 contacts a stopper during exposure, camera shake correction in the contact direction is disabled, and a photographed picture becomes a shaken one.

Therefore, whether or not the camera shake correction lens 17 contacts a stopper during exposure is detected.

Referring to FIG. 5, in step S91, whether or not the camera shake correction lens 17 contacts a stopper during exposure is detected by the camera shake correction lens position detection means 15. If NO in step S91, the flow advances to step S93; otherwise, the flow advances to step S97.

Figure 9:
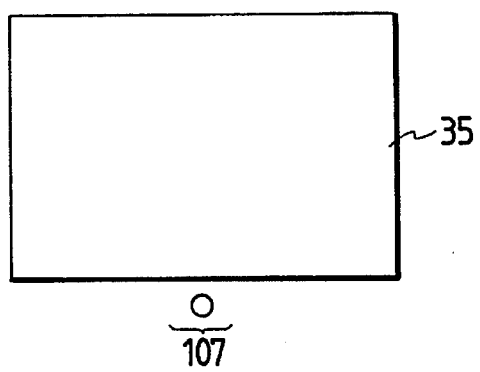
FIG. 9 is a view showing still another indication of the anti-shake camera of the embodiment shown in FIG. 1.

In step S93, a ○ mark is turned on as the indication pattern 107, as shown in FIG. 9, thus informing the photographer that a camera shake correction lens 17 does not contact a stopper during exposure, and camera shake correction is normally performed. The indication pattern 107 is kept ON for several seconds after a photographing operation for the purpose of confirmation. After the operation in step S93, the flow advances to step S95.

In step S97, a × mark is turned on as the indication pattern 107 (at the indication position of the ○ mark in FIG. 9), thereby informing the photographer that the camera shake correction lens 17 contacts a stopper during exposure, and camera shake correction is not normally performed. In this case, the indication pattern 107 of the × mark is kept ON for several seconds after a photographing operation for the purpose of confirmation.

The ○ and × marks need not always be indicated on the indication portion around the finder screen as in this embodiment, but may be indicated on the outer casing of the camera.

After the operation in step S97, the flow advances to step S95. In step S95, the flow returns to step S11 in FIG. 3.

The present invention is not limited to the above embodiment, and various modifications may be made. For example, the camera shake correction lens 17 is returned to the neutral position as a setting position, but may be returned to the opposite end portion. In this manner, even when a camera shake continuously occurs in the same direction even after the frame 18 of the camera shake correction lens 17 contacts a stopper, the movable range of the camera shake correction lens 17 can be maximized.

As described above, according to the present invention, since the operation range limiting means (stoppers) for limiting the movable range of the camera shake correction lens are arranged, and camera shake correction is not performed until an image is actually deteriorated, a clear picture can be taken.

At this time, if the camera is moved according to the indication patterns, since the camera shake correction lens is located at the setting position (the center or the opposite end portion) of the correction stroke, the correction stroke can be maximized for camera shakes in every directions, and a possibility of taking a picture free from a camera shake can be increased.

When the camera shake correction lens approaches the operation range limiting means, this is informed to a photographer using large indication patterns, and he or she will not overlook them.

Furthermore, when the camera shake correction lens contacts the operation range limiting means, the lens is returned to the setting position, thus maximizing the correction stroke.

Figure 12:
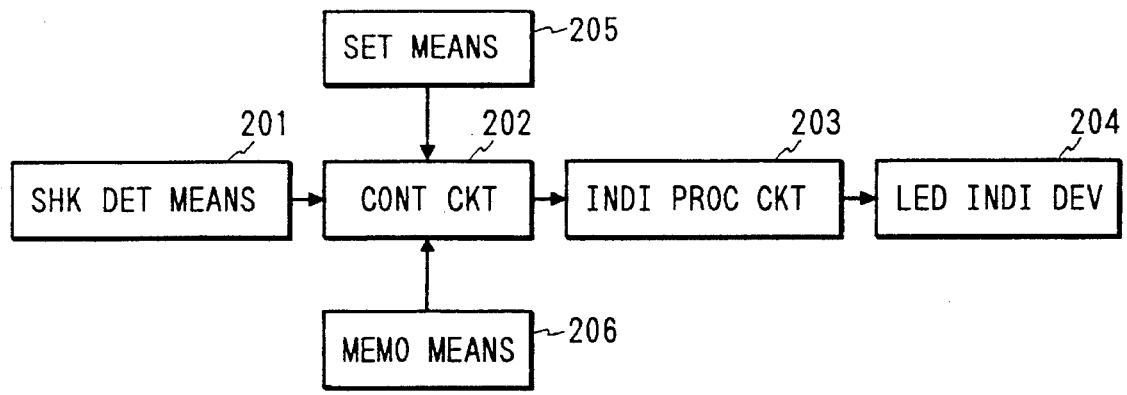
FIG. 12 is a block diagram showing an embodiment of an arrangement of a camera shake alarm device according to the present invention.
Figure 13:
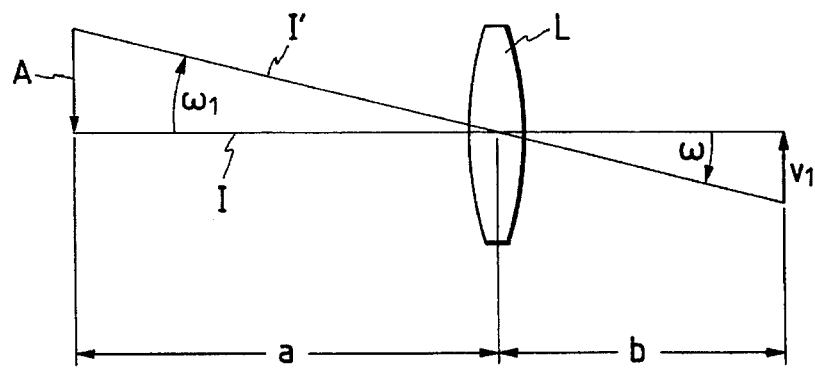
FIG. 13 is a view showing the relationship between the camera shake and image blurring.

FIG. 12 is a block diagram showing an arrangement of a camera shake alarm device according to an embodiment of the present invention. In FIG. 12, a shake detection means 201 is provided to a camera main body or a lens. The shake detection means 201 comprises, e.g., an acceleration sensor, an angular velocity sensor, or the like. The shake detection means 201 outputs signal information according to a detected vibration (camera shake), and supplies it to a control circuit 202. The control circuit 202 is connected to an indication processing circuit 203, and the indication processing circuit 203 controls an LED indication device 204 to perform a shake indication. Inherent information of a photographing lens such as a focal distance is stored in a memory means 206 such as a ROM or a CPU arranged in an exchangeable lens in the case of a single-lens reflex camera. When the exchangeable lens is mounted on a camera body, the memory means is connected to the control circuit 202 in the camera body via, e.g., electrical contacts, and the information is supplied to the control circuit 202. In the case of a lens shutter camera, lens inherent information is stored in a memory means 206 arranged in the camera body, and is supplied to the control circuit 202. The control circuit 202 also receives photographing conditions such as a current shutter speed as signal information from a set means 205. The control circuit 202 determines a shake limit value on the basis of the input information. When a low shutter speed is set, the shake limit value becomes strict, as is apparent to those who are skilled in the art. When a photographing optical system having a large focal distance is mounted, the shake limit value becomes strict. The shake limit value information is input to the indication processing circuit 203, and the indication processing circuit 203 controls a shake limit value indication.

The relationship between the angular acceleration (output from the shake detection means) upon inclination of the camera and the shake will be explained below with reference to FIGS. 14A to 14D. If the distance from a lens L to an object A is represented by a, the distance to a focal plane is represented by b, and the focal distance of the lens L is represented by f, an image formation formula is expressed by:

$$1/a + 1/b = 1/f \tag{1}$$

From this relation, if an optical axis I is inclined to I' at an angular velocity $\omega_1$, a moving velocity $v_1$ of an image on the focal plane is given by:

$$v_1 = (af\omega_1)/(a-f) \tag{2}$$

If a shutter time is represented by t, a shake amount $d_1$ is given by:

$$d_1 = v_1 t \tag{3}$$

If the shake amount $d_1$ is smaller than, e.g., the diameter δ (δ=1/30 mm) of a least circle of confusion, no problem is posed; otherwise, an image is blurred.

When the camera has an anti-shake device, if an image on a focal plane B is moved by the device at a velocity $v_2$, a shake amount d at that time is given by:

$$d = (v_1 - v_2) \cdot t \tag{4}$$

If the shake amount d is larger than the diameter δ of the least circle of confusion, an image is "blurred".

If an allowable shake value is assumed to be the diameter δ of the least circle of confusion, an allowable shake angular velocity ω can be inversely calculated, and is input to the indication processing circuit 203 as shake limit value information.

FIGS. 14A to 14D show an arrangement of the LED indication device 204. As shown in FIGS. 14A to 14D, the LED indication device 204 has a plurality of LED elements E, which are two-dimensionally arranged in a matrix, and are turned on to indicate a shake state. The number of ON LED elements E represents the shake amount, and the ON positions of the LED elements E shown in black represent the shake direction. FIG. 14A shows an indication when a shake occurs in the vertical direction; FIG. 14B shows an indication when a shake occurs in the horizontal direction; and FIG. 14C shows an indication when a shake occurs obliquely. The shake amount is represented by the length of a line segment defined by the ON LED elements E, and the shake direction is represented by the inclination of the line segment. As the number of LED elements E to be arranged is larger, both the amount and direction of a shake can be more finely indicated. However, as shown in FIG. 14D, the LED elements E may be radially arranged to simplify the arrangement.

FIG. 15A shows an embodiment of an indication of the shake limit value, and illustrates a state wherein no problem is posed as long as a shake falls within a range surrounded by ON LEDs. FIG. 15B shows a state wherein a shake exceeds the limit value. Alternatively, LEDs on the outermost peripheral portion may be turned on, as shown in FIG. 15C. When the shake limit value becomes strict upon setting of a low shutter speed, a narrow range surrounded by ON LED elements E is indicated. Alternatively, the indication of the shake limit value may remain the same, and the number of ON LED elements E representing the shake amount may be increased/decreased so as to increase/decrease the length of the line segment according to a change in limit value.

As another indication method of the shake limit value, no new indication pattern is added, and if a shake falls within the arranged LED indication device 204, it may be determined that no problem is posed. For example, when an indication pattern shown in FIGS. 14A, 14B, or 14C is indicated, a shake falls within the limit value range, and no problem is posed. In this case, the number of ON LED elements E representing the shake amount is increased/decreased to increase/decrease the length of the line segment according to a change in limit value, as well. As an alarm to be generated when a shake exceeds the limit value, all the LED elements E may be turned on at that time, thus giving clearer information to the photographer.

The above-mentioned LED indication device 204 may be arranged on an indication portion on a mount of the camera, or may be arranged in the finder, or information may be projected into the finder.

In the above embodiment, the LED indication device 204 is constituted by two-dimensionally arranging the LED elements E in a matrix. However, the present invention is not limited to this. For example, the LED elements may be arranged in various other patterns including a circular pattern to obtain the same effect as described above.

As described above, according to the present invention, when a camera shake occurs, the shake is indicated as a line segment, and both the amount and direction of the camera shake can be indicated. Thus, the behavior of the camera shake can be clearly informed to a photographer. The photographer can grasp a limit shutter speed free from a shake, or can recognize the direction in which a shake easily occurs. Such information can be reflected in the next photographing operation, and remarkable effects can be expected.

Figure 16:
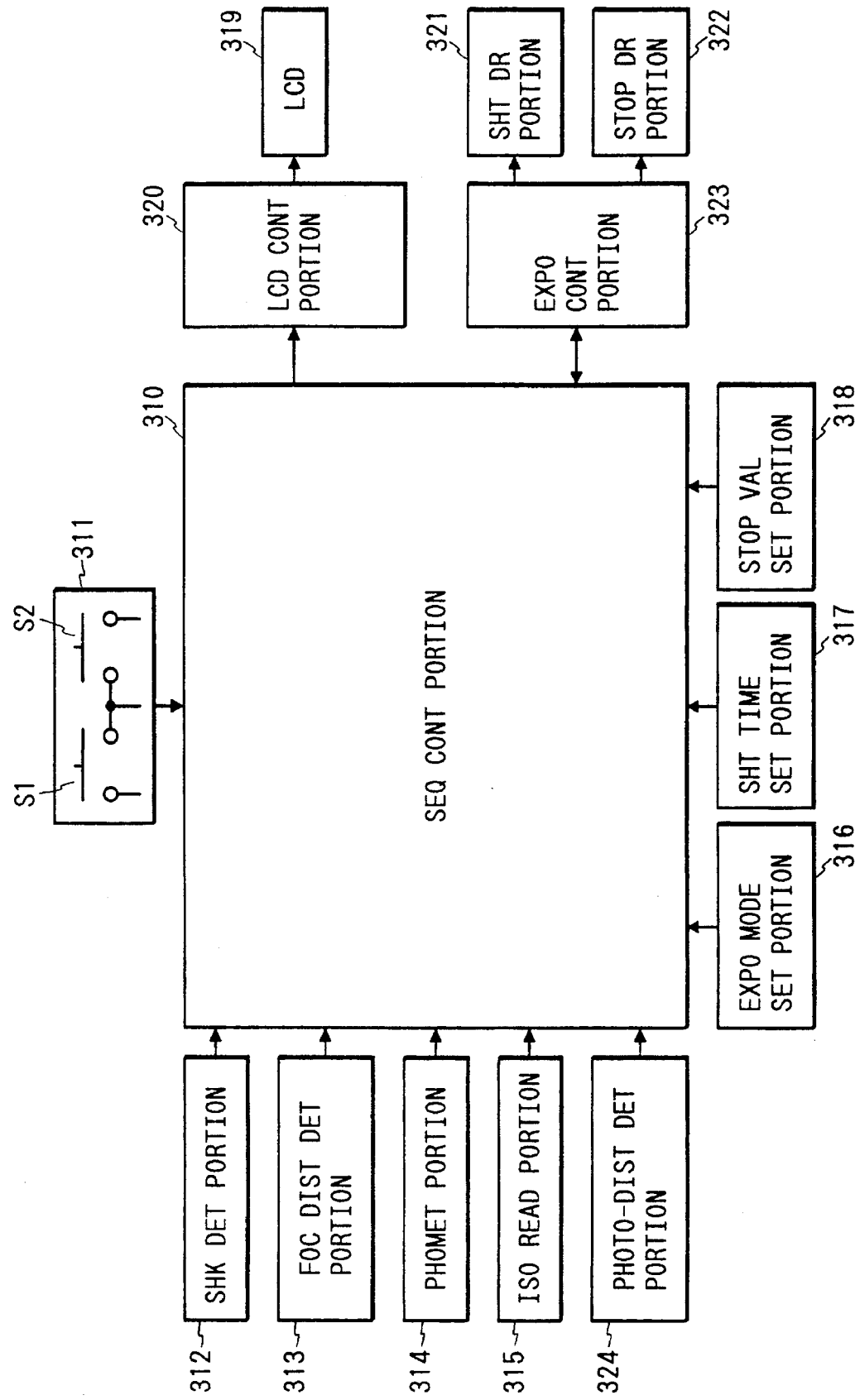
FIG. 16 is a block diagram showing an embodiment of a camera shake indication device for a camera according to the present invention.

FIG. 16 is a block diagram showing an embodiment of the present invention. The overall camera is controlled by a sequence control portion 310 comprising a computer.

The sequence control portion 310 is connected to a release switch portion 311 having a half-stroke switch S1 and a full-stroke switch S2, which are sequentially turned on upon depression of a release button by a photographer, a shake detection portion 312 for detecting a shake by detecting the inclination of the camera using an angular velocity sensor, a focal distance detection portion 313 for detecting the focal distance of a photographing lens using an encoder, a photometry portion 314 for measuring the brightness of an object, an ISO read portion 315 for reading ISO data representing the sensitivity of a film to be used, an exposure mode set portion 316 for setting various exposure modes including a shutter priority mode, a stop priority mode, and the like, a shutter time set portion 317 for setting a shutter time using a shutter dial, a stop value set portion 318 for setting a stop value using a stop ring, an LCD control portion 320 for performing indication control of an LCD 319 arranged on the outer surface of the camera or in a finder, an exposure control portion 323 for controlling a shutter driving portion 321 and a stop driving portion 322 according to commands from the sequence control portion 310, and a photographing distance detection portion 324. The photographing distance detection portion 324 detects an output from a distance measuring element in the case of an autofocus camera for detecting the distance from the camera to an object, and detects the extension amount of a lens in the case of a manual focus camera.

Figure 17:
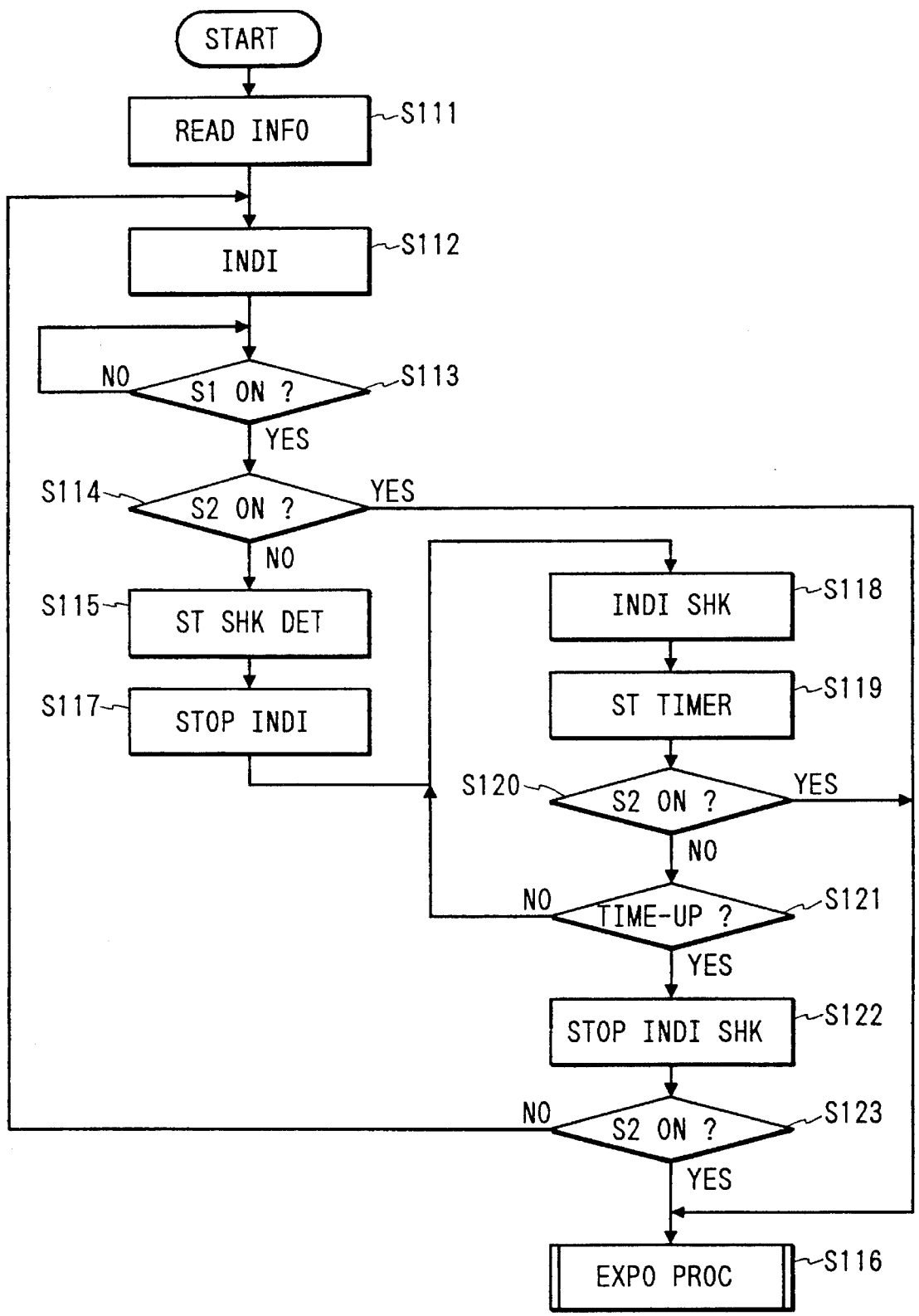
FIG. 17 is a flow chart for explaining a camera shake indication operation according to the present invention.

A camera shake indication operation of the camera with the above arrangement will be described below with reference to the flow chart shown in FIG. 17.

The camera shake indication operation is started when a main switch of the camera is turned on. Various kinds of information such as a focal distance, a photographing distance, a shutter time, a manual exposure value, an exposure correction value, and the like are read (step S111), and are indicated on the LCD 319 as photographing information (step S112).

The ON/OFF states of the half- and full-stroke switches S1 and S2 of the release switch portion 311 are checked (steps S113 and S114). When the half-stroke switch S1 alone is turned on, a shake detection operation of the shake detection portion 312 is started (step S115). When both the switches S1 and S2 are turned on, the flow immediately jumps to EXPO processing (step S116; to be described later).

When the shake detection operation of the shake detection portion 312 is started (step S115), indication of some pieces of photographing information (e.g., a shutter time) indicated on the LCD 319 is stopped (step S117), and a shake amount is indicated utilizing an indication element for indicating the shutter time (step S118).

Figure 18A:
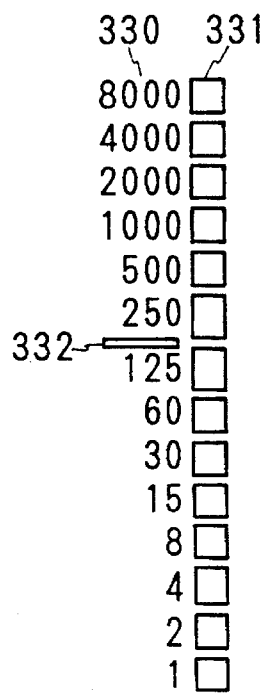
FIGS. 18A to 18C are views showing an embodiment of an indication pattern in the processing shown in FIG. 17.

As shown in FIG. 18A, the indication element for indicating the shutter time consists of shutter scale marks 330 including shutter time marks from ¹⁄₁ sec to ¹⁄₈,₀₀₀ sec, rectangular segments 331 arranged in correspondence with the shutter scale marks, and a shake scale mark 332 arranged between the shutter scale marks "¹⁄₁₂₅ sec" and "¹⁄₂₅₀ sec".

Figure 18B:
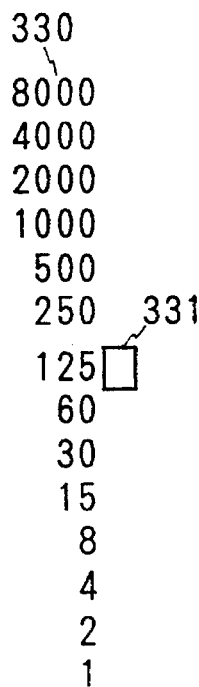
Figure 18C:
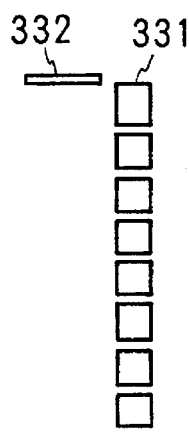

When this indication element indicates a shutter time, the shutter scale marks 330, and one of the segments 331 corresponding to a selected shutter time (e.g., ¹⁄₁₂₅ sec) are turned on, and the shake scale mark 332 is turned off, as shown in FIG. 18B. When the shake amount is indicated, the shake amount is level-indicated in an analog manner to have the lowermost one of the rectangular segments 331 as a start point, as shown in FIG. 18C. When the shake amount exceeds the shake scale mark 332, it represents that the shake is large. At this time, the shutter scale marks 330 are turned off.

The shake state is determined on the basis of the angular velocity upon inclination of the camera, the focal distance, the photographing distance, the shutter time, and the like, as described above. When the camera has an anti-shake device for preventing a shake by shifting a lens, the shake amount is indicated in consideration of an allowable range depending on the performance of the anti-shake device.

When the shake indication (step S118) is started in this manner, a timer is started (step S119), and it is checked if the full-stroke switch S2 is turned on (step S120). Before the full-stroke switch S2 is turned on, the shake indication is continued until the timer reaches a time-up state (step S121). When the full-stroke switch S2 is turned on (step S120), the flow immediately jumps to the EXPO processing (step S116; to be described later).

When it is determined that the timer has reached the time-up state (step S121), the shake indication on the LCD 319 is stopped (step S122), and it is checked again if the full-stroke switch S2 is turned on (step S123). If the full-stroke switch S2 is not turned on, the flow returns to step S112, and various kinds of photographing information including the shutter time are indicated on the LCD 319 again. On the other hand, if the switch S2 is turned on, the EXPO processing is executed. More specifically, a stop mechanism is stopped down to a selected stop value, a mirror-up operation is performed, a shutter is opened to properly expose a film, the shutter is closed, the stop is opened, and a mirror-down operation is performed (step S116). The series of camera shake indication operations are repeated until the main switch of the camera is turned off.

Figure 19A:
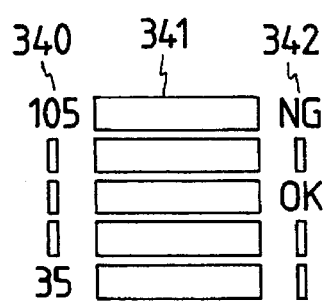
FIGS. 19A to 19C are views showing another embodiment of an indication pattern in the processing shown in FIG. 17.
Figure 19B:
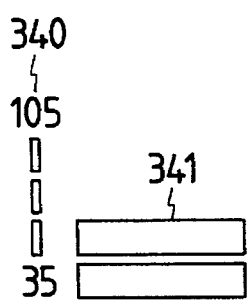
Figure 19C:
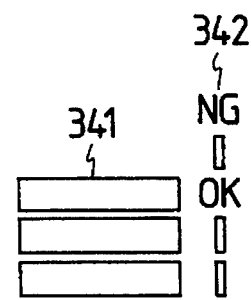

FIGS. 19A to 19C show another embodiment of an indication pattern of the shake indication. In this embodiment, a shake amount is indicated utilizing an indication element for the focal distance of the photographing information indicated on the LCD 319. The indication element for indicating the focal distance consists of focal distance scale marks 340, five bar segments 341, and shake scale marks 342, as shown in FIG. 19A.

When this indication element indicates a focal distance, the focal distance scale marks 340 and the segments 341 are used, and the shake scale marks 342 are turned off, as shown in FIG. 19B. When a shake amount is indicated, a shake state is level-indicated in an analog manner using the five bar segments 341, as shown in FIG. 19C. In this case, before the ON segments of the shake indication reach an "OK" indication of the shake scale marks 342, the shake amount is small, and no problem is posed. However, as the ON segments approach the "NG" indication side beyond the "OK" indication, the shake amount becomes larger.

Figure 20A:
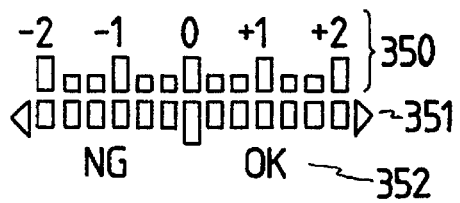
FIGS. 20A to 20C are views showing still another embodiment of an indication pattern in the processing shown in FIG. 17.
Figure 20B:
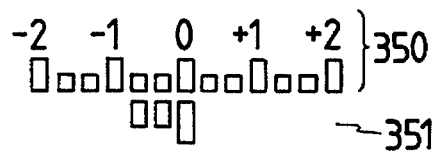
Figure 20C:

FIGS. 20A to 20C show still another embodiment of an indication pattern of the shake indication. In this embodiment, a shake amount is indicated utilizing an indication element for an exposure level in a manual exposure mode of the photographing information indicated on the LCD 319. The indication element for indicating the exposure level consists of exposure level scale marks 350, rectangular segments 351 arranged in correspondence with the exposure level scale marks, and shake scale marks 352, as shown in FIG. 20A.

When this indication element indicates an exposure level in the manual exposure mode, the exposure level scale marks 350 and the segments 351 are used, as shown in FIG. 20B, so as to indicate an under- or over-exposure amount on the left- or right-hand side of a proper exposure level "0" as a reference level. At this time, the shake scale marks 352 are turned off. When a shake amount is indicated, a shake state is level-indicated using the rectangular segments 351 in an analog manner to have the rightmost segment as a start point, as shown in FIG. 20C. When the indicated level reaches a segment on the right-hand side of the central segment, the shake amount is small, and no problem is posed ("OK" area). However, when the level exceeds the central segment, and becomes close to the leftmost segment, the shake amount is large ("NG" area).

Figure 21A:
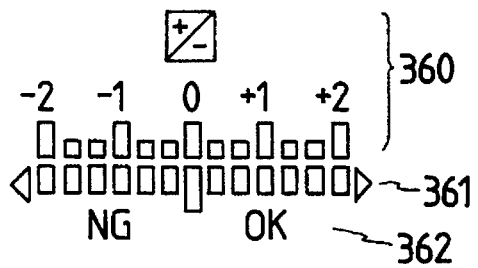
FIGS. 21A to 21C are views showing still another embodiment of an indication pattern in the processing shown in FIG. 17.
Figure 21B:
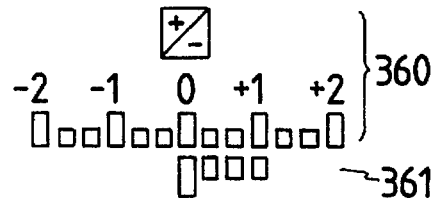
Figure 21C:
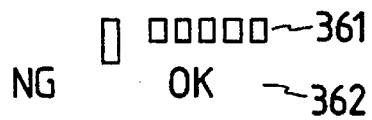

FIGS. 21A to 21C show still another embodiment of an indication pattern of the shake indication. In this embodiment, a shake amount is indicated utilizing an indication element for an exposure correction value of the photographing information indicated on the LCD 319. The indication element for indicating the exposure correction value consists of correction level scale marks 360, rectangular segments 361 arranged in correspondence with the correction level scale marks, and shake scale marks 362, as shown in FIG. 21A.

When this indication element indicates an exposure correction value, the correction level scale marks 360 and the segments 361 are used, as shown in FIG. 21B, so as to indicate an exposure correction increment/decrement amount on the left- or right-hand side of a proper exposure level "0" as a reference level. At this time, the shake scale marks 362 are turned off. When a shake amount is indicated, a shake state is level-indicated using the rectangular segments 361 in an analog manner to have the rightmost segment as a start point, as shown in FIG. 21C. When the indicated level reaches a segment on the right-hand side of the central segment, the shake amount is small, and no problem is posed ("OK" area). However, when the level exceeds the central segment, and becomes close to the leftmost segment, the shake amount is large ("NG" area).

Figure 22:
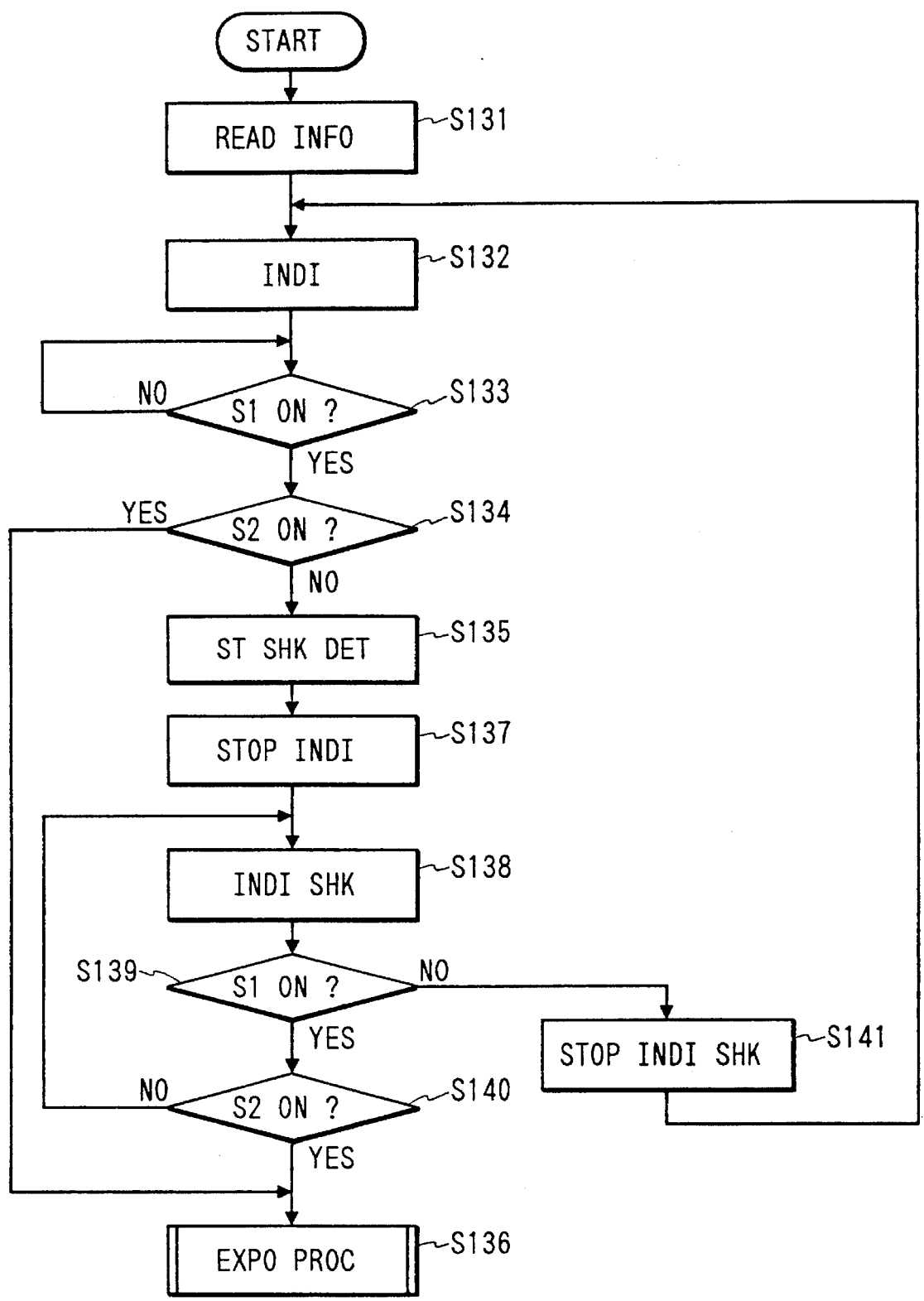
FIG. 22 is a flow chart showing for explaining another embodiment of a camera shake indication operation according to the present invention.

Another embodiment of a camera shake indication device for a camera according to the present invention will be described below. This embodiment has the same arrangement as that shown in FIG. 16, and only a processing sequence of a camera shake indication operation by the sequence control portion 310 is different. Therefore, the camera shake indication operation of this embodiment will be described below with reference to the flow chart shown in FIG. 22.

The camera shake indication operation of this embodiment is started when the main switch of the camera is turned on. Various kinds of information such as a focal distance, a photographing distance, a shutter time, a manual exposure value, an exposure correction value, and the like are read (step S131), and are indicated on the LCD 319 as photographing information (step S132).

The ON/OFF states of the half- and full-stroke switches S1 and S2 of the release switch portion 311 are checked (steps S133 and S134). When the half-stroke switch S1 alone is turned on, a shake detection operation of the shake detection portion 312 is started (step S135). When both the switches S1 and S2 are turned on upon depression of the release button, EXPO processing is immediately executed (step S136; to be described later).

When the shake detection operation of the shake detection portion 312 is started (step S135), indication of some pieces of photographing information (e.g., a shutter time) indicated on the LCD 319 is stopped (step S137), and a shake amount is indicated utilizing an indication element for indicating the shutter time (step S138).

Figure 23A:
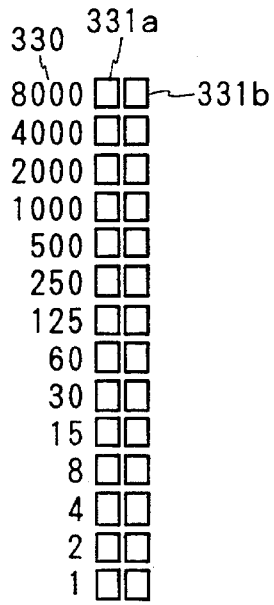
FIGS. 23A to 23E are views showing an embodiment of an indication pattern in the processing shown in FIG. 22.
Figure 23B:
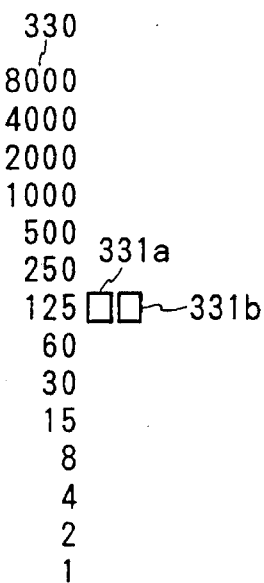

As shown in FIG. 23A, the indication element for the shutter time of this embodiment consists of shutter scale marks 330 including shutter time marks from ¼ sec to ⅛,₀₀₀ sec, and two arrays of rectangular segments 331a and 331b arranged in correspondence with the shutter scale marks. When a shutter time is indicated by this indication element, the shutter scale marks 330 and ones of the rectangular segments 331a and 331b corresponding to a selected shutter time (e.g., ¹⁄₁₂₅ sec) are turned on, as shown in FIG. 23B.

Figure 23C:
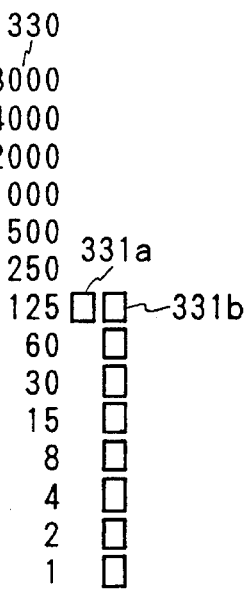
Figure 23D:
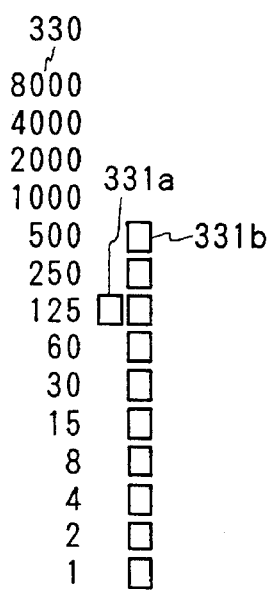
Figure 23E:
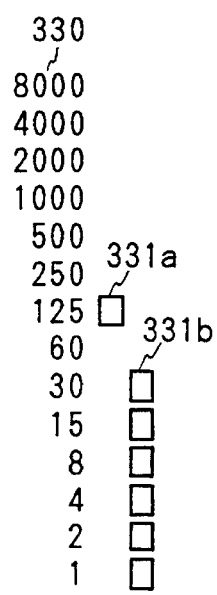

When a shake amount is indicated, the shutter scale marks 330, and one of the rectangular segments 331a corresponding to the selected shutter time (e.g., ¹⁄₁₂₅ sec) are turned on, and at the same time, a shake state is level-indicated using the rectangular segment 331b in an analog manner to have the lowermost segment as a start point, as shown in FIGS. 23C to 23E. This indication represents whether the shake amount is large or small relative to the selected shutter time.

For example, as shown in FIG. 23D, when the shake indication using the segments 331b exceeds the indication position of the shutter time using the corresponding segment 331a, it represents that the shake amount is large relative to the selected shutter time, and the shutter time must be increased up to ⅟₅₀₀ sec. On the other hand, as shown in FIG. 23E, when the shake indication using the segments 331b is lower than the indication position of the shutter time using the corresponding segment 331a, it represents that the shake amount has a sufficient margin for the selected shutter time, and no shake state occurs even when the shutter time is decreased to ¹⁄₃₀ sec.

In this manner, this embodiment utilizes the close relationship between the shutter time and the shake amount expressed by equations (3) and (4), and indicates whether the shake amount is large or small relative to the selected shutter time. Therefore, a photographer easily understands the relationship between the shake amount and the shutter time, and can easily select a proper shutter time.

When the shake indication (step S138) is started in this manner, the ON/OFF states of the half- and full-stroke switches S1 and S2 are checked again (steps S139 and S140). When the half-stroke switch S1 is OFF, the shake indication is stopped, and the flow returns to step S132 (step S141), and various kinds of photographing information are indicated on the LCD 319 again. When the half-stroke switch S1 alone is turned on, the shake indication is continued by repeating the processing operations in steps S138 to S140. When the full-stroke switch S2 is turned on during this interval (step S140), the EXPO processing is executed (step S136). More specifically, a stop mechanism is stopped down to a selected stop value, a mirror-up operation is performed, a shutter is opened to properly expose a film, the shutter is closed, the stop is opened, and a mirror-down operation is performed. The series of camera shake indication operations are repeated until the main switch of the camera is turned off.

Figure 24A:
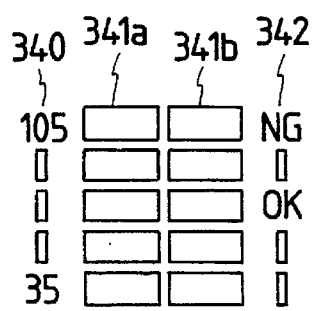
FIGS. 24A to 24C are views showing another embodiment of an indication pattern in the processing shown in FIG. 22.
Figure 24B:
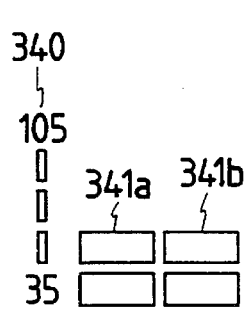
Figure 24C:
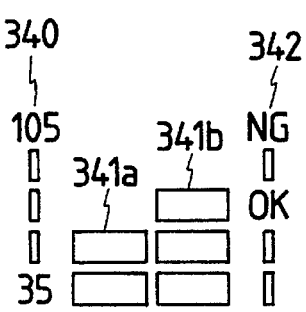

FIGS. 24A to 24C show another embodiment of an indication pattern of the shake indication. In this embodiment, a shake amount is indicated utilizing an indication element for the focal distance of the photographing information indicated on the LCD 319. The indication element for indicating the focal distance consists of focal distance scale marks 340, two arrays of five bar segments 341a and 341b, and shake scale marks 342, as shown in FIG. 24A.

When a focal distance is indicated by this indication element, the two arrays of bar segments 341a and 341b are used, as shown in FIG. 24B. When a shake amount is indicated, a focal distance is indicated using the segments 341a, and at the same time, a shake state is level-indicated using the segments 341b, as shown in FIG. 24C. In this case, before the ON segments of the shake indication reach an "OK" indication of the shake scale marks 342, the shake amount is small, and no problem is posed. However, as the ON segments approach the "NG" indication side beyond the "OK" indication, the shake amount becomes larger.

Figure 25A:
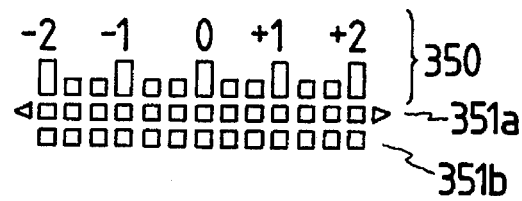
FIGS. 25A to 25C are views showing still another embodiment of an indication pattern in the processing shown in FIG. 22.
Figure 25B:
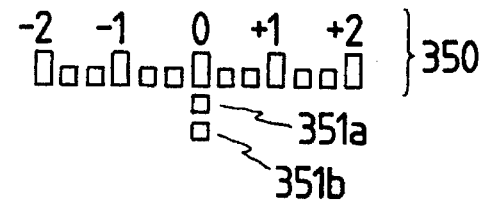
Figure 25C:
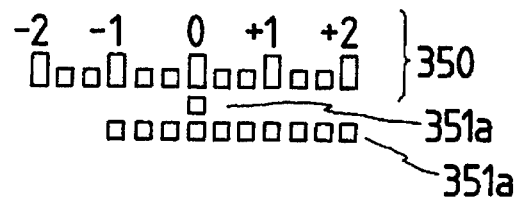

FIGS. 25A to 25C show still another embodiment of an indication pattern of the shake indication. In this embodiment, a shake amount is indicated utilizing an indication element for an exposure level in a manual exposure mode of the photographing information indicated on the LCD 319. The indication element for indicating the exposure level consists of exposure level scale marks 350, and two arrays of rectangular segments 351a and 351b arranged in correspondence with the exposure level scale marks, as shown in FIG. 25A.

When this indication element indicates an exposure level in the manual exposure mode, the exposure level scale marks 350 and ones of the segments 351a and 351b corresponding to the selected exposure level are turned on, as shown in FIG. 25B, so as to indicate an under- or over-exposure amount on the left- or right-hand side of a proper exposure level "0" as a reference level.

When a shake amount is indicated, the exposure level scale marks 350 and one of the segments 351a corresponding to the selected exposure level are turned on, and at the same time, a shake state is level-indicated using the rectangular segments 351b in an analog manner to have the rightmost segment as a start point, as shown in FIG. 25C. This indication represents whether the shake amount is large or small relative to the exposure level.

For example, as shown in FIG. 25C, when the shake indication using the segments 351b is located on the left-hand side of the indication position of the exposure level using the corresponding segment 351a, it represents that the shake amount is large relative to the exposure level determined based on the relationship between the shutter time and the stop at that time, and the shutter time must be increased until the exposure level reaches an under-exposure level of "−1". At this time, if a proper exposure level is to be set, the stop value can be increased accordingly.

Figure 26A:
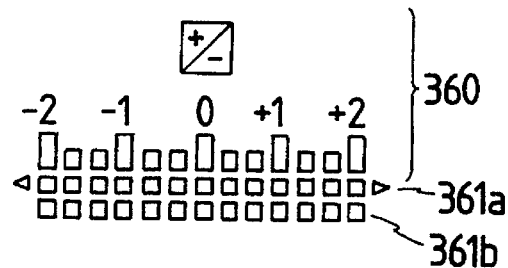
FIGS. 26A to 26C are views showing still another embodiment of an indication pattern in the processing shown in FIG. 22.
Figure 26B:
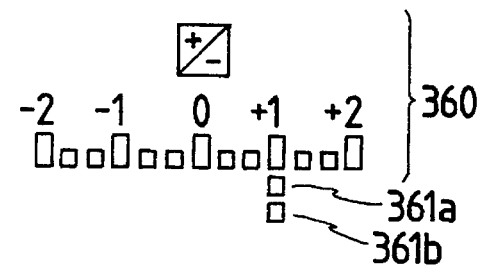
Figure 26C:
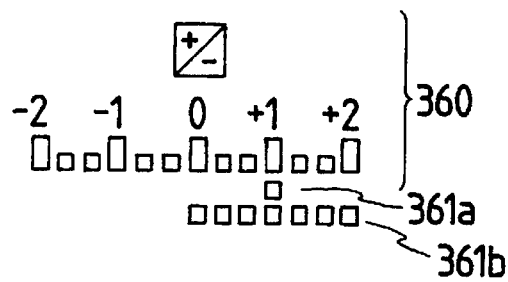

FIGS. 26A to 26C show still another embodiment of an indication pattern of the shake indication. In this embodiment, a shake amount is indicated utilizing an indication element for an exposure correction value of the photographing information indicated on the LCD 319. The indication element for indicating the exposure correction value consists of correction level scale marks 360, and two arrays of rectangular segments 361a and 361b arranged in correspondence with the correction level scale marks, as shown in FIG. 26A.

When this indication element indicates an exposure correction value, the correction level scale marks 360 and ones of the segments 361a and 361b corresponding to the correction level at that time are turned on, as shown in FIG. 26B, so as to indicate an under- or over-exposure amount on the left- or right-hand side of a proper exposure level "0" as a reference level.

When a shake amount is indicated, the correction level scale marks 360 and one of the rectangular segments 361a corresponding to the correction level at that time are turned on, and at the same time, a shake state is level-indicated using the rectangular segments 361b in an analog manner to have the rightmost segment as a start point, as shown in FIG. 26C. This indication represents whether the shake amount is large or small relative to the exposure level.

For example, as shown in FIG. 26C, when the shake indication using the segments 361b is located on the left-hand side of the indication position of the correction level using the corresponding segment 361a, it represents that the shake amount is large, and the shutter time must be increased to have a correction value "0". At this time, when an over-exposure level of "+1" is to be selected, the stop value can be increased accordingly.

According to the present invention, since the shake indication of the camera is performed using the indication element for indicating photographing information of the camera, the shake amount of the camera can be indicated without requiring any special indication portion. When the selected photographing information (e.g., a shutter time) and the shake amount are simultaneously indicated, a photographer easily understands the relationship between the shutter time and the shake amount, and can easily select a proper shutter time.

Since the indication element level-indicates a camera shake state in an analog manner, a photographer can easily recognize the degree of shake.

Since the shake indication of the camera is executed when the release button is depressed to its half-stroke position, a photographer can recognize in advance a shake state or an operation state of the anti-shake device. In particular, when the shake indication is made on an external indicator of the camera, it is effective for a lens shutter camera, which cannot check a shake amount in a finder.

What is claimed is:

1. An anti-shake camera comprising:

a camera shake correction lens for correcting image blurring caused by a camera shake;

camera shake correction lens position detection means for detecting a displacement position of said camera shake correction lens with respect to a neutral position; and indication means for indicating to a photographer, based on an output from said camera shake correction lens position detection means, a shaking direction of said camera so as to decrease a displacement amount of said camera shake correction lens from the neutral position.

2. A camera according to claim 1, wherein said indication means indicates the shaking direction of said camera by an indication amount which changes non-linearly as the displacement amount of said camera shake correction lens from the neutral position changes.

3. A camera according to claim 1, wherein said indication means indicates the shaking direction of said camera by an indication amount which becomes larger as compared to the displacement amount of said camera shake correction lens from the neutral position as the displacement amount becomes larger.

4. A camera according to claim 1, wherein said camera shake correction lens position detection means comprises:

neutral position detection means for defining the neutral position of said camera shake correction lens, and for providing an output when said camera shake correction lens is located at the neutral position;

movement detection means for providing an output corresponding to a moving direction and a moving amount of said camera shake correction lens; and position calculation means for calculating a position of said camera shake correction lens based on the outputs from said neutral position detection means and said movement detection means.

5. An anti-shake camera comprising:

a camera shake correction lens movable for correcting image blurring caused by a camera shake;

operation range limiting means for limiting a movement range of said camera shake correction lens;

camera shake correction lens position detection means for detecting a displacement position of said camera shake correction lens with respect to a neutral position; and indication means operating when said camera shake correction lens approaches a limit position of said movement range for indicating to a photographer, based on an output of said camera shake correction lens position detection means, a shaking direction of said camera which will decrease a displacement amount of said camera shake correction lens from the neutral position, said indication means providing an indication amount which is larger as compared to the displacement amount when said camera shake correction lens is close to the limit position than when said camera shake correction lens is far from the limit position.

6. An anti-shake camera comprising:

a camera shake correction lens movable in a plane perpendicular to an optical axis;

driving means for detecting a direction and an amount of a camera shake, and moving said camera shake correction lens according to a movement direction and a movement amount determined based on the detected direction and amount;

camera shake correction lens position detection means for detecting an amount of eccentricity of said camera shake correction lens from the optical axis; and indication means for indicating to a photographer, based on an output from said camera shake correction lens position detection means, a direction in which said camera should be shaken to make the amount of eccentricity zero.

7. An anti-shake camera comprising:

a camera shake correction lens movable in a plane perpendicular to an optical axis;

driving means for detecting a direction and an amount of a camera shake, and moving said camera shake correction lens according to a movement direction and a movement amount determined based on the detected direction and amount;

limiting means for defining limits of a movement range of said camera shake correction lens;

camera shake correction lens position detection means for detecting an amount of eccentricity of said camera shake correction lens from the optical axis, and for outputting an approach signal when said camera shake correction lens approaches a limit of the movement range; and indication means for indicating to a photographer a direction in which said camera should be shaken to make the amount of eccentricity zero, wherein said indication means changes an indication mode thereof based on the approach signal as said camera shake correction lens approaches said limit of said movement range.

8. A camera according to claim 7, wherein said indication means increases an indication area in response to said approach signal as said camera shake correction lens approaches said limit.

9. A camera according to claim 8, wherein the indication area is changed stepwise.

10. A camera according to claim 8, wherein the indication area is changed continuously.

11. A camera according to claim 7, wherein said camera shake correction lens position detection means comprises neutral position detection means for detecting a neutral position of said camera shake correction lens, and movement detection means for detecting a moving amount and a moving direction of said camera shake correction lens.

12. An anti-shake camera comprising:
    a camera shake correction lens movable in a plane perpendicular to an optical axis;
    driving means for detecting a direction and an amount of a camera shake, and moving said camera shake correction lens according to a movement direction and a movement amount determined based on the detected direction and amount;
    camera shake correction lens position detection means for detecting an amount of eccentricity of said camera shake correction lens from the optical axis;
    limiting means for defining limit positions of a movement range of said camera shake correction lens; and
    indication means for indicating to a photographer, based on an output from said camera shake correction lens position detection means, that said camera shake correction lens has reached a limit position of the movement range during an exposure operation.

13. A camera according to claim 12, wherein operation, said indication means performs the indication after the exposure operation.

14. An anti-shake camera comprising:
    a camera shake correction lens movable in a plane perpendicular to an optical axis;
    driving means for detecting a direction and an amount of a camera shake, and moving said camera shake correction lens according to a movement direction and a movement amount determined based on the detected direction and amount;
    camera shake correction lens position detection means for detecting an amount of eccentricity of said camera shake correction lens from the optical axis;
    limiting means for defining limit positions of a movement range of said camera shake correction lens; and
    indication means for indicating to a photographer, based on an output from said camera shake correction lens position detection means, that said camera shake correction lens has reached a limit position of the movement range.

15. A camera shake alarm device for a camera, comprising:
    camera shake detection means for detecting a direction and an amount of a camera shake of the camera; and
    indication means for indicating to a photographer a direction and an amount corresponding to the detected direction and amount of the camera shake and, simultaneously therewith, showing an amount corresponding to an allowable camera shake limit value.

16. A camera shake alarm device for a camera, comprising:
    camera shake detection means for detecting a direction and an amount of a camera shake of the camera; and
    indication means for indicating to a photographer a direction and an amount corresponding to the detected direction and amount of the camera shake,
    wherein said indication means comprises LEDs aligned in vertical, horizontal, and oblique directions, and of the LEDs aligned in a direction corresponding to the detected direction of the camera shake, LEDs corresponding in number to the detected amount of the camera shake are turned on.

17. A device according to claim 16, wherein said indication means provides an indication corresponding to an allowable camera shake limit value.

18. A camera shake indication device for a camera, comprising:
    camera shake detection means for detecting a camera shake amount of the camera based on an output from a camera shake detection sensor, and generating a shake signal corresponding to the detected camera shake amount;
    information signal generation means for generating an information signal corresponding to a value associated with photographing information of the camera;
    indication means having scale marks for the value associated with the photographing information, scale marks for the camera shake amount, and a level indication element consisting of a plurality of segments; and
    indication control means for selecting one of the shake signal and the information signal, and energizing said level indication element of said indication means based on the selected signal.

19. A device according to claim 18, wherein said indication control means selects the shake signal when a release button is depressed to a half-stroke position.

20. A device according to claim 18, wherein said indication means changes an indication pattern in correspondence with the camera shake amount.

21. A device according to claim 18, wherein the value associated with the photographing information is a shutter time.

22. A device according to claim 18, wherein the value associated with the photographing information is an exposure correction value.

23. A device according to claim 18, wherein the value associated with the photographing information is a focal distance of a camera lens.

24. A camera shake alarm device for a camera, comprising:
    camera shake detection means for detecting a direction and an amount of a camera shake of a camera body; and
    indication means having an indicator for simultaneously indicating to a photographer a direction and an amount corresponding to the detected direction and amount of the camera shake, and for showing an amount corresponding to a camera shake limit value.

25. A camera shake alarm device for a camera, comprising:
    camera shake detection means for detecting a direction and an amount of a camera shake of a camera body; and
    indication means having an indicator for simultaneously indicating to a photographer a direction and an amount corresponding to the detected direction and amount of the camera shake, in the form of a line having a direction which is changed among horizontal, vertical, and oblique directions in accordance with the detected direction of the camera shake and a length which is changed in accordance with the detected amount of the camera shake.

26. A camera shake alarm device according to claim 25, wherein said indication means indicates an amount corresponding to a limit value of the camera shake within an indication range of said indicator.

27. An anti-shake camera comprising:
    a finder screen through which a photographing image plane is observed;
    a camera shake correction optical member, constituting a part of a photographing optical system, for correcting image blurring caused by a camera shake by moving within a predetermined range with respect to a camera body;

camera shake correction optical member position detection means for detecting a displacement position of said camera shake correction optical member with respect to a neutral position; and indication means having an indicator for indicating at an outside of said finder screen, based on an output from said camera shake correction optical member position detection means, a shaking direction of said camera so as to decrease a displacement amount of said camera shake correction optical member from the neutral position.

28. An anti-shake camera according to claim 27, wherein said camera shake correction optical member moves in a plane perpendicular to an optical axis of said photographing optical system.

29. An anti-shake camera according to claim 27, wherein said indicating means makes an indication which, as compared to the displacement amount of said camera shake correction optical member from the neutral position, is larger when said displacement amount is large than when said displacement amount is small.

30. An anti-shake camera according to claim 27, wherein said indicating means makes an indication which changes non-linearly as the displacement amount of said camera shake correction optical member from the neutral position changes.

31. An anti-shake camera according to claim 27, further comprising neutral position detecting means for defining a center position of a movement range of said camera shake correction optical member as the neutral position, and wherein said indicating means makes an indication which, as compared to a distance between the center position of said movement range of said camera shake correction optical member and a detected position thereof, is larger when said distance is large than when said distance is small.

32. An anti-shake camera according to claim 32, further comprising range limiting means for limiting a movement range of said camera shake correction optical member, and wherein said indicating means makes an indication which, as compared to a distance between a limit of said movement range of said camera shake correction optical member and a detected position thereof, is larger when said distance is small than when said distance is large.

33. An anti-shake camera comprising:

a camera shake correction optical member, constituting a part of a photographing optical system, for correcting image blurring caused by a camera shake by moving within a predetermined movement range with respect to a camera body;

camera shake correction optical member position detection means for detecting a displacement position of said camera shake correction optical member with respect to a neutral position of said movement range; and indication means for making an indication to a photographer, based on an output of said camera shake correction optical member position detection means, which changes non-linearly with respect to a displacement amount between the camera shake correction optical member and the neutral position.

34. An anti-shake camera according to claim 33, wherein said indicating means makes an indication which, as compared to the displacement amount of said camera shake correction optical member from the neutral position, is larger when said displacement amount is large than when said displacement amount is small.

35. An anti-shake camera according to claim 33, wherein said indicating means makes an indication showing a direction along which the camera should be swung so that the displacement position of said camera shake correction optical member approaches the neutral position of said movement range.

36. An anti-shake camera comprising:

shake detecting means for detecting a direction and an amount of a camera shake caused on a camera body;

a camera shake correction optical member, constituting a part of a photographing optical system, for correcting image blurring caused by a camera shake by moving within a predetermined range with respect to the camera body;

first shake correction driving means for moving said camera shake correction optical member in a first direction in a plane perpendicular to an optical axis of said photographing optical system within said predetermined range in accordance with a detection output from said shake detecting means;

second shake correction driving means for moving said camera shake correction optical member in a second direction in said plane perpendicular to the optical axis of said photographing optical system within said predetermined range in accordance with a detection output from said shake detecting means;

first position detecting means for detecting a displacement position of said camera shake correction optical member along said first direction with respect to a neutral position of said predetermined range;

second position detecting means for detecting a displacement position of said camera shake correction optical member along said second direction with respect to the neutral position; and indicating means having an indicator for indicating to a photographer, based on an output of said first position detecting means, a direction along and an amount by which the camera body should be swung so that the displacement position of said camera shake correction optical member along said first direction approaches the neutral position, and, based on an output of said second position detecting means, a direction along and an amount by which the camera body should be swung so that the displacement position of said camera shake correction optical member along said second direction approaches the neutral position.

37. An anti-shake camera according to claim 36, further comprising a finder screen through which a photographing image plane is observed, and wherein said indicator is arranged outside of said finder screen.

38. An anti-shake camera comprising:

shake detecting means for detecting a direction and an amount of a camera shake caused on camera body;

a camera shake correction optical member, constituting a part of a photographing optical system, for correcting image blurring caused by a camera shake by moving within a predetermined range with respect to the camera body;

first shake correction driving means for moving said camera shake correction optical member in a first direction in a plane perpendicular to an optical axis of said photographing optical system within said predetermined range in accordance with a detection output from said shake detecting means;

second shake correction driving means for moving said camera shake correction optical member in a second direction in said plane perpendicular to the optical axis of said photographing optical system within said predetermined range in accordance with a detection output from said shake detecting means;

first limiting means for limiting said predetermined range along said first direction;

second limiting means for limiting said predetermined range along said second direction;

first position detecting means for detecting a position of said camera shake correction optical member along said first direction;

second position detecting means for detecting a position of said camera shake correction optical member along said second direction; and indicating means having a first indicator for indicating to a photographer, based on an output of said first position detecting means, when the position of said camera shake correction optical member approaches a limit position defined by said first limiting means, and having a second indicator for indicating to a photographer, based on an output of said second position detecting means, when the position of said camera shake correction optical member approaches a limit position defined by said second limiting means.

39. An anti-shake camera according to claim 38, wherein said first and second indicators of said indicating means indicate with indication areas which, as compared with respective distances between said camera shake correction optical member and said limit positions, are larger when said distances are large than when said distances are small.

40. An anti-shake camera comprising:

shake detecting means for detecting a direction and an amount of a camera shake caused on a camera body;

a camera shake correction optical member, constituting a part of a photographing optical system, for correcting image blurring caused by a camera shake by moving within a predetermined range with respect to the camera body;

shake correction driving means for moving said camera shake correction optical member in a plane perpendicular to an optical axis of said photographing optical system within said predetermined range in accordance with a detection output from said shake detecting means;

limiting means for limiting said predetermined range;

position detecting means for detecting a position of said camera shake correction optical member;

limit detecting means for detecting that said camera shake correction optical member reaches a limit position defined by said limiting means;

first indicating means for indicating to a photographer, based on an output from said position detecting means, when the position of said camera shake correction optical member approaches said limit position; and second indicating means for indicating to the photographer, based on an output of said limit detecting means, when said camera shake correction optical member reaches said limit position during an exposure operation of the camera.

41. An anti-shake camera according to claim 40, further comprising a finder screen through which a photographing image plane is observed, and wherein said first and second indicating means include respective indicators arranged outside of said finder screen.

42. An anti-shake still camera comprising:

a first switch for starting a shake correction drive;

a second switch for starting an exposure operation;

shake detecting means for detecting a direction and an amount of a camera shake caused on a camera body;

a camera shake correction optical member, constituting a part of a photographing optical system, for correcting image blurring caused by a camera shake by moving within a predetermined range with respect to the camera body;

shake correction driving means for moving said camera shake correction optical member in a plane perpendicular to an optical axis of said photographing optical system within said predetermined range in accordance with a detection output from said shake detecting means;

limiting means for limiting said predetermined range;

position detecting means for detecting a position of said camera shake correction optical member;

limit detecting means for detecting that said camera shake correction optical member reaches a limit position defined by said limiting means; and indicating means for indicating to a photographer, based on an output from said limit detecting means, when said camera shake correction optical member reaches said limit position during an exposure operation of the camera started by said second switch.

43. An anti-shake still camera comprising:

a first switch for starting a shake correction drive;

a second switch for starting an exposure operation;

shake detecting means for detecting a direction and an amount of a camera shake caused on a camera body;

a camera shake correction optical member, constituting a part of a photographing optical system, for correcting image blurring caused by a camera shake by moving within a predetermined range with respect to a camera body;

shake correction driving means for moving said camera shake correction optical member in a plane perpendicular to an optical axis of said photographing optical system within said predetermined range in accordance with a detection output from said shake detecting means;

limiting means for limiting said predetermined range;

position detecting means for detecting a position of said camera shake correction optical member;

limit detecting means for detecting that said camera shake correction optical member reaches a limit position defined by said limiting means; and indicating means responsive to said limit detecting means for indicating to a photographer when said limit detecting means does not detect that said camera shake correction optical member reaches said limit position during an exposure operation of the camera started by said second switch.

44. A camera shake indicating apparatus comprising:

camera shake detecting means for detecting an amount of camera shake based on an output from a camera shake sensor, and outputting a shake signal corresponding to the detected amount of camera shake;

a switch for starting an operation of said camera shake detecting means;

information signal outputting means for outputting an information signal relating to photographing information of the camera;

indicating means for making an indication based upon the information signal outputted from said information signal outputting means before said switch is turned on, and for making an indication based upon the shake signal outputted from said camera shake detecting means after said switch is turned on.

45. A camera shake indicating apparatus comprising:

camera shake detecting means for detecting an amount of camera shake based on an output from a camera shake sensor, and outputting a shake signal corresponding to the detected amount of camera shake;

information signal outputting means for outputting an information signal relating to photographing information of the camera;

indicating means having an indicator in a finder of the camera; and indication control means for selecting between said shake signal and said information signal, and controlling operation of said indicating means based on the selected signal.

46. An anti-shake camera comprising:

a camera shake correction lens for correcting image blurring caused by a camera shake;

a camera shake correction lens position detection portion which detects a displacement position of said camera shake correction lens with respect to a neutral position; and an indication portion which indicates to a photographer, based on an output from said camera shake correction lens position detection portion, a shaking direction of said camera so as to decrease a displacement amount of said camera shake correction lens from the neutral position.

47. A camera according to claim 46, wherein said indication portion indicates the shaking direction of said camera by an indication amount which changes non-linearly as the displacement amount of said camera shake correction lens from the neutral position changes.

48. A camera according to claim 46, wherein said indication portion indicates the shaking direction of said camera by an indication amount which becomes larger as compared to the displacement amount of said camera shake correction lens from the neutral position as the displacement amount becomes larger.

49. A camera according to claim 46, wherein said camera shake correction lens position detection portion comprises:

a neutral position detection portion which defines the neutral position of said camera shake correction lens, and which provides an output when said camera shake correction lens is located at the neutral position;

a movement detection portion which provides an output corresponding to a moving direction and a moving amount of said camera shake correction lens; and a position calculation portion which calculates a position of said camera shake correction lens based on the outputs from said neutral position detection portion and said movement detection portion.

50. An anti-shake camera comprising:

a camera shake correction lens movable for correcting image blurring caused by a camera shake;

an operation range limiting portion which limits a movement range of said camera shake correction lens;

a camera shake correction lens position detection portion which detects a displacement position of said camera shake correction lens with respect to a neutral position; and an indication portion operating when said camera shake correction lens approaches a limit position of said movement range to indicate to a photographer, based on an output of said camera shake correction lens position detection portion, a shaking direction of said camera which will decrease a displacement amount of said camera shake correction lens from the neutral position, said indication portion providing an indication amount which is larger as compared to the displacement amount when said camera shake correction lens is close to the limit position than when said camera shake correction lens is far from the limit position.

51. An anti-shake camera comprising:

a camera shake correction lens movable in a plane perpendicular to an optical axis;

a driving portion which detects a direction and an amount of a camera shake, and which moves said camera shake correction lens according to a movement direction and a movement amount determined based on the detected direction and amount;

a camera shake correction lens position detection portion which detects an amount of eccentricity of said camera shake correction lens from the optical axis; and an indication portion which indicates to a photographer, based on an output from said camera shake correction lens position detection portion, a direction in which said camera should be shaken to make the amount of eccentricity zero.

52. An anti-shake camera comprising:

a camera shake correction lens movable in a plane perpendicular to an optical axis;

a driving portion which detects a direction and an amount of a camera shake, and which moves said camera shake correction lens according to a movement direction and a movement amount determined based on the detected direction and amount;

a limiting portion which defines limits of a movement range of said camera shake correction lens;

a camera shake correction lens position detection portion which detects an amount of eccentricity of said camera shake correction lens from the optical axis, and which outputs an approach signal when said camera shake correction lens approaches a limit of the movement range; and an indication portion which indicates to a photographer a direction in which said camera should be shaken to make the amount of eccentricity zero;

wherein said indication portion changes an indication mode thereof based on the approach signal as said camera shake correction lens approaches said limit of said movement range.

53. A camera according to claim 52, wherein said indication portion increases an indication area in response to said approach signal as said camera shake correction lens approaches said limit.

54. A camera according to claim 53, wherein the indication area is changed stepwise.

55. A camera according to claim 53, wherein the indication area is changed continuously.

56. A camera according to claim 52, wherein said camera shake correction lens position detection portion comprises a neutral position detection portion which detects a neutral position of said camera shake correction lens, and a movement detection portion which detects a moving amount and a moving direction of said camera shake correction lens.

57. An anti-shake camera comprising:

a camera shake correction lens movable in a plane perpendicular to an optical axis;

a driving portion which detects a direction and an amount of a camera shake, and which moves said camera shake correction lens according to a movement direction and a movement amount determined based on the detected direction and amount;

a camera shake correction lens position detection portion which detects an amount of eccentricity of said camera shake correction lens from the optical axis;

a limiting portion which defines limit positions of a movement range of said camera shake correction lens; and an indication portion which indicates to a photographer, based on an output from said camera shake correction lens position detection portion, that said camera shake correction lens has reached a limit position of the movement range during an exposure operation.

58. A camera according to claim 57, wherein said indication portion performs the indication after the exposure operation.

59. An anti-shake camera comprising:

a camera shake correction lens movable in a plane perpendicular to an optical axis;

a driving portion which detects a direction and an amount of a camera shake, and which moves said camera shake correction lens according to a movement direction and a movement amount determined based on the detected direction and amount;

a camera shake correction lens position detection portion which detects an amount of eccentricity of said camera shake correction lens from the optical axis;

a limiting portion which defines limit positions of a movement range of said camera shake correction lens; and an indication portion which indicates to a photographer, based on an output from said camera shake correction lens position detection portion, that said camera shake correction lens has reached a limit position of the movement range.

60. A camera shake alarm device for a camera, comprising:

a camera shake detection portion which detects a direction and an amount of a camera shake of the camera; and an indication portion which indicates to a photographer a direction and an amount corresponding to the detected direction and amount of the camera shake and, simultaneously therewith, shows an amount corresponding to an allowable camera shake limit value.

61. A camera shake alarm device for a camera, comprising:

a camera shake detection portion which detects a direction and an amount of a camera shake of the camera; and an indication portion which indicates to a photographer a direction and an amount corresponding to the detected direction and amount of the camera shake, wherein said indication portion comprises LEDs aligned in vertical, horizontal, and oblique directions, and of the LEDs aligned in a direction corresponding to the detected direction of the camera shake, LEDs corresponding in number to the detected amount of the camera shake are turned on.

62. A device according to claim 61, wherein said indication portion provides an indication corresponding to an allowable camera shake limit value.

63. A camera shake indication device for a camera, comprising:

a camera shake detection portion which detects a camera shake amount of the camera based on an output from a camera shake detection sensor, and which generates a shake signal corresponding to the detected camera shake amount;

an information signal generation portion which generates an information signal corresponding to a value associated with photographing information of the camera;

an indication portion having scale marks for the value associated with the photographing information, scale marks representing the camera shake amount, and a level indication element consisting of a plurality of segments; and an indication control portion which selects one of the shake signal and the information signal, and which energizes said level indication element of said indication portion based on the selected signal.

64. A device according to claim 63, wherein said indication control portion selects the shake signal when a release button is depressed to a half-stroke position.

65. A device according to claim 63, wherein said indication portion changes an indication pattern in correspondence with the camera shake amount.

66. A device according to claim 63, wherein the value associated with the photographing information is a shutter time.

67. A device according to claim 63, where in the value associated with the photographing information is an exposure correction value.

68. A device according to claim 63, where in the value associated with the photographing information is a focal distance of a camera lens.

69. A camera shake alarm device for a camera, comprising:

a camera shake detection portion which detects a direction and an amount of a camera shake of a camera body; and an indication portion having an indicating device which simultaneously indicates to a photographer a direction and an amount corresponding to the detected direction and amount of the camera shake, and which shows an amount corresponding to a camera shake limit value.

70. A camera shake alarm device for a camera, comprising:

a camera shake detection portion which detects a direction and an amount of a camera shake of a camera body; and an indication portion having an indicating device which simultaneously indicates to a photographer a direction and an amount corresponding to the detected direction and amount of the camera shake, in the form of a line having a direction which is changed among horizontal, vertical, and oblique directions in accordance with the detected direction of the camera shake and a length which is changed in accordance with the detected amount of the camera shake.

71. A camera shake alarm device according to claim 70, wherein said indication portion indicates an amount corresponding to a limit value of the camera shake within an indication range of said indicating device.

72. An anti-shake camera comprising:

a finder screen through which a photographing image plane is observed;

a camera shake correction optical member, constituting a part of a photographing optical system, and which corrects image blurring caused by a camera shake by moving within a predetermined range with respect to a camera body;

a camera shake correction optical member position detection portion which detects a displacement position of said camera shake correction optical member with respect to a neutral position; and an indication portion having an indicating device which indicates at an outside of said finder screen, based on an output from said camera shake correction optical member position detection portion, a shaking direction of said camera so as to decrease a displacement amount of said camera shake correction optical member from the neutral position.

73. An anti-shake camera according to claim 72, wherein said camera shake correction optical member moves in a plane perpendicular to an optical axis of said photographing optical system.

74. An anti-shake camera according to claim 72, wherein said indicating portion makes an indication which, as compared to the displacement amount of said camera shake correction optical member from the neutral position, is larger when said displacement amount is large than when said displacement amount is small.

75. An anti-shake camera according to claim 72, wherein said indicating portion makes an indication which changes non-linearly as the displacement amount of said camera shake correction optical member from the neutral position changes.

76. An anti-shake camera according to claim 72, further comprising a neutral position detecting portion which defines a center position of a movement range of said camera shake correction optical member as the neutral position, and wherein said indicating portion makes an indication which, as compared to a distance between the center position of said movement range of said camera shake correction optical member and a detected position thereof, is larger when said distance is large than when said distance is small.

77. An anti-shake camera according to claim 72, further comprising a range limiting portion which limits a movement range of said camera shake correction optical member, and wherein said indicating portion makes an indication which, as compared to a distance between a limit of said movement range of said camera shake correction optical member and a detected position thereof, is larger when said distance is small than when said distance is large.

78. An anti-shake camera comprising:

a camera shake correction optical member, constituting a part of a photographing optical system, for correcting image blurring caused by a camera shake by moving within a predetermined movement range with respect to a camera body;

a camera shake correction optical member position detection portion which detects a displacement position of said camera shake correction optical member with respect to a neutral position of said movement range; and an indication portion that makes an indication to a photographer, based on an output of said camera shake correction optical member position detection portion, which changes non-linearly with respect to a displacement amount between the camera shake correction optical member and the neutral position.

79. An anti-shake camera according to claim 78, where in said indicating portion makes an indication which, as compared to the displacement amount of said camera shake correction optical member from the neutral position, is larger when said displacement amount is large than when said displacement amount is small.

80. An anti-shake camera according to claim 78, where in said indicating portion makes an indication showing a direction along which the camera should be swung so that the displacement position of said camera shake correction optical member approaches the neutral position of said movement range.

81. An anti-shake camera comprising:

a shake detecting portion which detects a direction and an amount of a camera shake caused on a camera body;

a camera shake correction optical member, constituting a part of a photographing optical system, and which corrects image blurring caused by a camera shake by moving within a predetermined range with respect to the camera body;

a first shake correction driving portion which moves said camera shake correction optical member in a first direction in a plane perpendicular to an optical axis of said photographing optical system within said predetermined range in accordance with a detection output from said shake detecting portion;

a second shake correction driving portion which moves said camera shake correction optical member in a second direction in said plane perpendicular to the optical axis of said photographing optical system within said predetermined range in accordance with a detection output from said shake detecting portion;

a first position detecting portion which detects a displacement position of said camera shake correction optical member along said first direction with respect to a neutral position of said predetermined range;

a second position detecting portion which detects a displacement position of said camera shake correction optical member along said second direction with respect to the neutral position; and an indicating portion having an indicating device which indicates to a photographer, based on an output of said first position detecting portion, a direction along and an amount by which the camera body should be swung so that the displacement position of said camera shake correction optical member along said first direction approaches the neutral position, and, based on an output of said second position detecting portion, a direction along and an amount by which the camera body should be swung so that the displacement position of said camera shake correction optical member along said second direction approaches the neutral position.

82. An anti-shake camera according to claim 81, further comprising a finder screen through which a photographing image plane is observed, and wherein said indicating device is arranged outside of said finder screen.

83. An anti-shake camera comprising:

a shake detecting portion which detects a direction and an amount of a camera shake caused on camera body;

a camera shake correction optical member, constituting a part of a photographing optical system, and which corrects image blurring caused by a camera shake by moving within a predetermined range with respect to the camera body;

a first shake correction driving portion which moves said camera shake correction optical member in a first direction in a plane perpendicular to an optical axis of said photographing optical system within said predetermined range in accordance with a detection output from said shake detecting portion;

a second shake correction driving portion which moves said camera shake correction optical member in a second direction in said plane perpendicular to the optical axis of said photographing optical system within said predetermined range in accordance with a detection output from said shake detecting portion;

a first limiting portion which limits said predetermined range along said first direction;

a second limiting portion which limits said predetermined range along said second direction;

a first position detecting portion which detects a position of said camera shake correction optical member along said first direction;

a second position detecting portion which detects a position of said camera shake correction optical member along said second direction; and an indicating portion having a first indicating device which indicates to a photographer, based on an output of said first position detecting portion, when the position of said camera shake correction optical member approaches a limit position defined by said first limiting portion, and having a second indicating device which indicates to a photographer, based on an output of said second position detecting portion, when the position of said camera shake correction optical member approaches a limit position defined by said second limiting portion.

84. An anti-shake camera according to claim 83, wherein said first and second indicating devices of said indicating portion indicate with indication areas which, as compared with respective distances between said camera shake correction optical member and said limit positions, are larger when said distances are large than when said distances are small.

85. An anti-shake camera comprising:

a shake detecting portion which detects a direction and an amount of a camera shake caused on a camera body;

a camera shake correction optical member, constituting a part of a photographing optical system, and which corrects image blurring caused by a camera shake by moving within a predetermined range with respect to the camera body;

a shake correction driving portion which moves said camera shake correction optical member in a plane perpendicular to an optical axis of said photographing optical system within said predetermined range in accordance with a detection output from said shake detecting portion;

a limiting portion which limits said predetermined range;

a position detecting portion which detects a position of said camera shake correction optical member;

a limit detecting portion which detects that said camera shake correction optical member reaches a limit position defined by said limiting portion;

a first indicating portion which indicates to a photographer, based on an output from said position detecting portion, when the position of said camera shake correction optical member approaches said limit position;

and a second indicating portion which indicates to the photographer, based on an output of said limit detecting portion, when said camera shake correction optical member reaches said limit position during an exposure operation of the camera.

86. An anti-shake camera according to claim 84, further comprising a finder screen through which a photographing image plane is observed, and wherein said first and second indicating portions include respective indicating devices arranged outside of said finder screen.

87. An anti-shake still camera comprising:

a first switch for starting a shake correction drive;

a second switch for starting an exposure operation;

a shake detecting portion which detects a direction and an amount of a camera shake caused on a camera body;

a camera shake correction optical member, constituting a part of a photographing optical system, and which corrects image blurring caused by a camera shake by moving within a predetermined range with respect to the camera body;

a shake correction driving portion which moves said camera shake correction optical member in a plane perpendicular to an optical axis of said photographing optical system within said predetermined range in accordance with a detection output from said shake detecting portion;

a limiting portion which limits said predetermined range;

a position detecting portion which detects a position of said camera shake correction optical member;

a limit detecting portion which detects that said camera shake correction optical member reaches a limit position defined by said limiting portion; and an indicating portion which indicates to a photographer, based on an output from said limit detecting portion, when said camera shake correction optical member reaches said limit position during an exposure operation of the camera started by said second switch.

88. An anti-shake still camera comprising:

a first switch for starting a shake correction drive;

a second switch for starting an exposure operation;

a shake detecting portion which detects a direction and an amount of a camera shake caused on a camera body;

a camera shake correction optical member, constituting a part of a photographing optical system, and which corrects image blurring caused by a camera shake by moving within a predetermined range with respect to a camera body;

a shake correction driving portion which moves said camera shake correction optical member in a plane perpendicular to an optical axis of said photographing optical system within said predetermined range in accordance with a detection output from said shake detecting portion;

a limiting portion which limits said predetermined range;

a position detecting portion which detects a position of said camera shake correction optical member;

a limit detecting portion which detects that said camera shake correction optical member reaches a limit position defined by said limiting portion; and an indicating portion responsive to said limit detecting portion and which indicates to a photographer when said limit detecting portion does not detect that said camera shake correction optical member reaches said limit position during an exposure operation of the camera started by said second switch.

89. A camera shake indicating apparatus comprising:

a camera shake detecting portion which detects an amount of camera shake based on an output from a camera shake sensor, and which outputs a shake signal corresponding to the detected amount of camera shake;

a switch for starting an operation of said camera shake detecting portion;

an information signal outputting portion which outputs an information signal relating to photographing information of the camera;

an indicating portion which makes an indication based on the information signal outputted from said information signal outputting portion before said switch is turned on, and which makes an indication based on the shake signal outputted from said camera shake detecting portion after said switch is turned on.

90. A camera shake indicating apparatus comprising:

a camera shake detecting portion which detects an amount of camera shake based on an output from a camera shake sensor, and which outputs a shake signal corresponding to the detected amount of camera shake;

an information signal outputting portion which outputs an information signal relating to photographing information of the camera;

an indicating portion having an indicator in a finder of the camera; and an indication control portion which selects between said shake signal and said information signal, and which controls operation of said indicating portion based on the selected signal.

91. A method of correcting shake of a camera, comprising:

correcting image blurring caused by the shake with a camera shake correction lens;

detecting a displacement position of said camera shake correction lens with respect to a neutral position; and indicating to a photographer, based on said detecting of the displacement position, a shaking direction of the camera so as to decrease a displacement amount of said camera shake correction lens from the neutral position.

92. A method of correcting shake of a camera, comprising:

correcting image blurring caused by the shake by moving a camera shake correction lens within a limited movement range;

detecting a displacement position of said camera shake correction lens with respect to a neutral position; and when said camera shake correction lens approaches a limit position of said movement range, providing to a photographer an indication, based on said detecting of the displacement position, of a shaking direction of said camera which will decrease a displacement amount of said camera shake correction lens from the neutral position, said indication having an indication amount which is larger as compared to the displacement amount when said camera shake correction lens is close to the limit position than when said camera shake correction lens is far from the limit position.

93. A method of correcting shake of a camera, comprising:

detecting a direction and an amount of the shake, and moving a camera shake correction lens in a plane perpendicular to an optical axis according to a movement direction and a movement amount determined based on the detected direction and amount;

detecting an amount of eccentricity of said camera shake correction lens from the optical axis; and indicating to a photographer, based on said detecting of the amount of eccentricity, a direction in which said camera should be shaken to make the amount of eccentricity zero.

94. A method of correcting shake of a camera, comprising:

detecting a direction and an amount of the shake, and moving a camera shake correction lens within a limited movement range in a plane perpendicular to an optical axis according to a movement direction and a movement amount determined based on the detected direction and amount;

detecting an amount of eccentricity of said camera shake correction lens from the optical axis, and generating an approach signal when said camera shake correction lens approaches a limit of said movement range;

indicating to a photographer a direction in which said camera should be shaken to make the amount of eccentricity zero, said indicating being effected in accordance with an indication mode which changes based on the approach signal as said camera shake correction lens approaches said limit of said movement range.

95. A method of correcting shake of a camera, comprising:

detecting a direction and an amount of the shake, and moving a camera shake correction lens within a limited movement range in a plane perpendicular to an optical axis according to a movement direction and a movement amount determined based on the detected direction and amount;

detecting an amount of eccentricity of said camera shake correction lens from the optical axis; and indicating to a photographer, based on said detecting of the amount of eccentricity, if said camera shake correction lens has reached a limit position of the movement range during an exposure operation.

96. A method of correcting shake of a camera, comprising:

detecting a direction and an amount of the shake, and moving a camera shake correction lens within a limited movement range in a plane perpendicular to an optical axis according to a movement direction and a movement amount determined based on the detected direction and amount;

detecting an amount of eccentricity of said camera shake correction lens from the optical axis; and indicating to a photographer, based on said detecting of the amount of eccentricity, if said camera shake correction lens has reached a limit position of the movement range.

97. A method of alarming in relation to shake of a camera, comprising:

detecting a direction and an amount of the shake; and indicating to a photographer a direction and an amount corresponding to the detected direction and amount of the shake and, simultaneously therewith, showing an amount corresponding to an allowable camera shake limit value.

98. A method of alarming in relation to shake of a camera, comprising:

detecting a direction and an amount of the shake; and indicating to a photographer, on an indicating device having LEDs aligned in vertical, horizontal, and oblique directions, a direction and an amount corresponding to the detected direction and amount of the shake, by turning on LEDs corresponding in number to the detected amount of the shake among the LEDs aligned in a direction corresponding to the detected direction of the shake.

99. A method of indicating camera shake, comprising:

detecting a shake amount of a camera, and generating a shake signal corresponding to the detected shake amount;

generating an information signal corresponding to a value associated with photographing information of the camera; and selecting one of the shake signal and the information signal, and making an indication based on the selected signal;

wherein the indication is made by one of scale marks for the value associated with the photographing information and scale marks for the camera shake amount, depending upon the selected signal, and a level indication element having a plurality of segments.

100. A method of alarming in relation to shake of a camera, comprising:

detecting a direction and an amount of shake of a body of the camera; and simultaneously indicating to a photographer a direction and an amount corresponding to the detected direction and amount of shake; and showing the photographer an amount corresponding to a camera shake limit value.

101. A method of alarming in relation to shake of a camera, comprising:

detecting a direction and an amount of shake of a camera body; and simultaneously indicating to a photographer a direction and an amount corresponding to the detected direction and amount of shake, in the form of a line having a direction which is changed among horizontal, vertical, and oblique directions in accordance with the detected direction of shake and a length which is changed in accordance with the detected amount of shake.

102. A method of correcting shake of a camera, comprising:

moving a camera shake correction optical member, constituting a part of a photographing optical system, within a predetermined range with respect to a camera body in order to correct image blurring caused by the shake; and detecting a displacement position of the camera shake correction optical member with respect to a neutral position; and indicating at an outside of a finder screen through which a photographing image plane is observed, and based on said detecting of displacement position, a shaking direction of the camera so as to decrease a displacement amount of said camera shake correction optical member from the neutral position.

103. A method of correcting shake of a camera, comprising:

moving a camera shake correction optical member, constituting a part of a photographing optical system, within a predetermined movement range with respect to a camera body in order to correct image blurring caused by the shake;

detecting a displacement position of said camera shake correction optical member with respect to a neutral position of said movement range; and providing to a photographer an indication, based on said detecting of the displacement position, in accordance with an indicating mode which changes non-linearly with respect to a displacement amount between said camera shake correction optical member and the neutral position.

104. A method of correcting shake of a camera, comprising:

detecting a direction and an amount of shake caused on a camera body;

based on said detecting, moving a camera shake correction optical member, constituting a part of a photographing optical system, in first and second directions within a predetermined range with respect to the camera body in a plane perpendicular to an optical axis of said photographing optical system in order to correct image blurring caused by the shake;

detecting a first displacement position of said camera shake correction optical member along said first direction with respect to a neutral position of said predetermined range;

detecting a second displacement position of said camera shake correction optical member along said second direction with respect to the neutral position; and indicating to a photographer, based on said detecting of the first displacement position, a direction along and an amount by which the camera body should be swung so that the displacement position of said camera shake correction optical member along said first direction approaches the neutral position, and, based on said detecting of the second displacement position, a direction along and an amount by which the camera body should be swung so that the displacement position of said camera shake correction optical member along said second direction approaches the neutral position.

105. A method of correcting shake of a camera, comprising:

detecting a direction and an amount of shake caused on a camera body;

based on said detecting, moving a camera shake correction optical member, constituting a part of a photographing optical system, along first and second directions within a predetermined range in a plane perpendicular to an optical axis of said photographing optical system in order to correct image blurring caused by the shake;

detecting a first position of said camera shake correction optical member along said first direction;

detecting a second position of said camera shake correction optical member along said second direction; and indicating to a photographer, based on said detecting of the first position, when said camera shake correction optical member approaches a limit of said predetermined range along said first direction, and, based on said detecting of the second position, when said camera shake correction optical member approaches a limit of said predetermined range along said second direction.

106. A method of correcting shake of a camera, comprising:

detecting a direction and an amount of shake caused on a camera body;

based on said detecting, moving a camera shake correction optical member, constituting a part of a photographing optical system, within a predetermined range with respect to the camera body in a plane perpendicular to an optical axis of said photographing optical system in order to correct image blurring caused by the shake;

detecting a position of said camera shake correction optical member;

detecting if said camera shake correction optical member reaches a limit position of said predetermined range;

indicating to a photographer, based on said detecting of position, if said camera shake correction optical member approaches said limit position; and indicating to the photographer, based on said detecting if said limit position is reached, when said camera shake correction optical member reaches said limit position during an exposure operation of the camera.

107. A method of correcting shake of a camera, comprising:

detecting a direction and an amount of shake caused on a camera body;

based on said detecting, moving a camera shake correction optical member, constituting a part of a photographing optical system, within a predetermined range with respect to the camera body in a plane perpendicular to an optical axis of said photographing optical system in order to correct image blurring caused by the shake;

detecting if said camera shake correction optical member reaches a limit position of said predetermined range; and indicating to a photographer, based on said detecting if said limit position is reached, when said camera shake correction optical member reaches said limit position during an exposure operation of the camera.

108. A method of correcting shake of a camera, comprising:

detecting a direction and an amount of shake caused on a camera body;

based on said detecting, moving a camera shake correction optical member, constituting a part of a photographing optical system, within a predetermined range with respect to the camera body in a plane perpendicular to an optical axis of said photographing optical system to correct image blurring caused by the shake;

detecting if said camera shake correction optical member reaches a limit position of said predetermined range; and indicating to a photographer, based on said detecting if said limit position is reached, when it is not detected that said camera shake correction optical member reaches said limit position during an exposure operation of the camera.

109. A method of indicating shake of a camera, comprising:

detecting an amount of the shake in response to operation of a switch, and outputting a shake signal corresponding to the detected amount of shake;

outputting an information signal relating to photographing information of the camera;

making an indication based on said information signal before the operation of said switch, and making an indication based on said shake signal after the operation of said switch.

110. A method of indicating shake of a camera, comprising:

detecting an amount of the shake, and outputting a shake signal corresponding to the detected amount of shake;

outputting an information signal relating to photographing information of the camera; and selecting between said shake signal and said information signal, and controlling operation of an indicating device based on the selected signal.

111. A photographing apparatus comprising:

an optical lens movable in a direction different from an optical axis direction;

lens movement detection means which detects an amount of movement of said optical lens; and indication means which indicates the amount of movement of said optical lens detected by said lens movement detection means.

112. A photographing apparatus according to claim 111, wherein said photographing apparatus is a still camera.

113. A photographing apparatus according to claim 112, wherein said optical lens is movable within a plane perpendicular to the optical axis.

114. A photographing apparatus according to claim 113, wherein said indication means has an indication portion which makes an indication that changes non-linearly with respect to the amount of movement of said optical lens detected by said lens movement detection means.

115. A method of indicating at an indication portion of a photographing apparatus, comprising:

detecting a position of a camera shake correction lens which constitutes a part of a photographing optical system; and indicating to a photographer whether said camera shake correction lens approaches a neutral position in a movement range thereof.

116. A method according to claim 115, wherein said indicating includes indicating a direction along which said photographing apparatus should be moved.

117. A method according to claim 115, wherein said indicating includes simultaneously indicating a direction and an amount representing how said photographing apparatus should be moved to bring said camera shake correction lens to the neutral position.

118. A method according to claim 117, wherein the amount indicated has a non-linear relationship with respect to a distance between a position of said camera shake correction lens and the neutral position.

119. A method of according to claim 118, wherein the amount indicated increases non-linearly as said distance becomes larger.

120. A method of providing an indication at an indication portion of a photographing apparatus, comprising:

detecting a position of a camera shake correction lens which constitutes a part of a photographing optical system; and indicating to a photographer whether said camera shake correction lens is displaced from a limit position of a movement range thereof.

121. A method according to claim 120, wherein said indicating includes indicating a direction along which said photographing apparatus should be moved.

122. A method according to claim 120, wherein said indicating includes simultaneously indicating a direction and an amount of movement representing how said photographing apparatus should be moved to bring said camera shake correction lens to a neutral position of the movement range.

123. A method according to claim 122, wherein the amount indicated has a non-linear relationship with respect to a distance between a position of said camera shake correction lens and the neutral position.

124. A method of according to claim 123, wherein the amount indicated increases non-linearly as said distance becomes larger.

* * * * *